(12) United States Patent
Das et al.

(10) Patent No.: US 9,820,154 B2
(45) Date of Patent: Nov. 14, 2017

(54) PARAMETER SCALING FOR FRACTIONAL BANDWIDTH SYSTEMS

(75) Inventors: Soumya Das, San Diego, CA (US);
Edwin C. Park, San Diego, CA (US);
Bongyong Song, San Diego, CA (US);
Ozgur Dural, San Diego, CA (US);
Samir Salib Soliman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 553 days.

(21) Appl. No.: 13/397,155

(22) Filed: Feb. 15, 2012

(65) Prior Publication Data
US 2013/0114415 A1 May 9, 2013

Related U.S. Application Data

(60) Provisional application No. 61/556,777, filed on Nov. 7, 2011.

(51) Int. Cl.
H04W 28/16 (2009.01)
H04W 16/02 (2009.01)
(Continued)

(52) U.S. Cl.
CPC ........... *H04W 16/02* (2013.01); *H04W 28/18* (2013.01); *H04W 16/14* (2013.01); *H04W 28/16* (2013.01);
(Continued)

(58) Field of Classification Search
None
See application file for complete search history.

(56) References Cited

U.S. PATENT DOCUMENTS 6,058,406 A * 5/2000 Karanovic ............ H03L 7/1974
708/313
6,535,723 B1 3/2003 Jiang et al.
(Continued)

FOREIGN PATENT DOCUMENTS

CN 1449162 A 10/2003
CN 101356789 A 1/2009
(Continued)

OTHER PUBLICATIONS

Co-pending U.S. Appl. No. 13/707,111, filed Dec. 6, 2012.
International Search Report and Written Opinion—PCT/US2012/063881—ISA/EPO—Mar. 21, 2013.

Primary Examiner — Hassan Phillips
Assistant Examiner — Ayanah George
(74) Attorney, Agent, or Firm — Holland & Hart LLP

(57) ABSTRACT

Methods, systems, and devices are described for making scaling adjustments with respect to a fractional subsystem in a wireless communications system. To handle the effects of scaling associated with fractional bandwidth systems, different adjustments may be made to maintain certain quality of service (QoS) requirements, for example. Scaling adjustments may include identifying a scaling factor for the fractional subsystem and a parameter and/or a timer associated with the fractional subsystem. An adjustment associated with the parameter and/or timer may be determined based on the scaling factor. The adjustment may be applied with respect to the parameter and/or timer for at least a portion of the fractional subsystem or another portion of the wireless communications system.

50 Claims, 19 Drawing Sheets

(51) Int. Cl.
   *H04W 28/18*  (2009.01)
   *H04W 16/14*  (2009.01)
   *H04W 72/00*  (2009.01)
   *H04W 72/04*  (2009.01)
   *H04W 76/02*  (2009.01)

(52) U.S. Cl.
   CPC ............ *H04W 72/00* (2013.01); *H04W 72/04* (2013.01); *H04W 76/022* (2013.01)

(56) References Cited

U.S. PATENT DOCUMENTS

| | | |
|---|---|---|
| 6,693,887 B2 | 2/2004 | Stanwood et al. |
| 7,408,898 B1* | 8/2008 | Brown ............... H04B 7/18515 370/250 |
| 7,535,900 B2 | 5/2009 | Shenoi |
| 7,602,707 B2 | 10/2009 | Guo et al. |
| 8,265,019 B2 | 9/2012 | Madan et al. |
| 8,340,115 B2* | 12/2012 | Waxman ................ H04B 7/061 370/437 |
| 2003/0074443 A1* | 4/2003 | Melaku ............... H04L 12/5692 709/224 |
| 2003/0231593 A1 | 12/2003 | Bauman et al. |
| 2004/0170150 A1* | 9/2004 | Guo et al. .................... 370/338 |
| 2007/0002892 A1* | 1/2007 | Waxman ................ H04B 7/061 370/465 |
| 2008/0117821 A1* | 5/2008 | Asati .................. H04L 12/4641 370/235 |
| 2009/0116389 A1 | 5/2009 | Ji et al. |
| 2009/0135713 A1* | 5/2009 | Hwang ................ H04L 5/0037 370/210 |
| 2011/0243193 A1 | 10/2011 | Nakajima |
| 2012/0008525 A1* | 1/2012 | Koskinen .............. H04W 28/22 370/253 |
| 2013/0114433 A1 | 5/2013 | Park et al. |
| 2013/0114436 A1 | 5/2013 | Dural et al. |
| 2013/0114473 A1 | 5/2013 | Awoniyi et al. |
| 2013/0114566 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0148520 A1 | 6/2013 | Das et al. |
| 2013/0148527 A1 | 6/2013 | Awiniyi et al. |
| 2013/0148576 A1 | 6/2013 | Huang et al. |
| 2013/0148579 A1 | 6/2013 | Das et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0182655 A1 | 7/2013 | Das et al. |

FOREIGN PATENT DOCUMENTS

| | | |
|---|---|---|
| EP | 1233594 A1 | 8/2002 |
| EP | 1993237 A2 | 11/2008 |
| JP | 2008543222 A | 11/2008 |
| JP | 2011041229 A | 2/2011 |
| KR | 20050115253 A | 12/2005 |
| WO | 2006132778 A2 | 12/2006 |
| WO | 2007052995 A1 | 5/2007 |
| WO | 2009061778 | 5/2009 |

* cited by examiner

◄— 1000-a

| Slot Cycle i | Period i |
|---|---|
| 0x00 to 0x06 | $2^{SlotCyclei} \times 4$ slots |
| 0x07 to 0x1c | $2^{(SlotCyclei-0x7)} \times 768$ Slots |

| Slot Cycle i | Period i |
|---|---|
| 0x00 to 0x06 | $2^{SlotCyclei} \times 4/N$ slots |
| 0x07 to 0x1c | $2^{(SlotCyclei-0x7)} \times 768/N$ Slots |

| Slot Cycle i | Period i |
|---|---|
| 0x00 to 0x06 | $2^{SlotCyclei} \times A$ slots |
| 0x07 to 0x1c | $2^{(SlotCyclei-0x7)} \times B$ Slots |

FIG. 10C

PARAMETER SCALING FOR FRACTIONAL BANDWIDTH SYSTEMS

CROSS-RELATED APPLICATIONS

The present application for patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile terminals. Base stations may communicate with mobile terminals on downstream and upstream links. In some cases, wireless communications systems may not utilize portions of the spectrum because the portions are not big enough to fit a standard waveform. New techniques may be developed to utilize these smaller portions of the spectrum. However, if current systems are scaled, there may be additional issues (e.g., time stretching) that arise.

SUMMARY

Methods, systems, and/or devices are provided that may allow for inverting or scaling the effects of time stretching associated with the use of fractional waveforms. A fractional waveform is a waveform that may occupy less bandwidth than a normal waveform, though in some embodiments, a fractional waveform may occupy more bandwidth than a normal waveform. For example, at a band edge, there may not be enough available spectrum to place a normal waveform. In a fractional bandwidth system, the same number of symbols and bits may be transmitted over a longer duration compared to a normal bandwidth (BW) system. This results in "time stretching" whereby slot duration, frame duration increase by a factor N, where N is the ratio of the normal BW to fractional BW. Thus, data rate in a fractional BW system is (Normal Rate×1/N), and delay is (Normal Delay×N). Therefore, the application may need to request higher rate and lower delay over air interface in a fractional BW system. However, it may not be desirable for applications/application servers to change for using the fractional BW system versus the normal BW system. Thus, there is a need to do QoS scaling. Similarly, slot cycle index and some other time-sensitive parameters might need to be scaled to keep the user experience at par with a normal BW system.

To handle the effects of scaling associated with fractional bandwidth systems, different adjustments may be made. For example, to maintain certain QoS requirements, some embodiments may utilize QoS from the fractional bandwidth system. Due to time stretching, it may be necessary to request a higher rate and lower delay over air interface in a fractional system, for example. Some embodiments may request a higher data rate class or profile and/or lower delay class or profile. In some embodiments, an application on a mobile device or application server may make a request based on these scaled QoS requirements. However, it may not be desirable for applications and/or application servers to change for using the fractional system versus the normal system. Instead, in some embodiments, the fractional system (or the fractional system's protocol layers) may scale the application QoS requirements.

Some embodiments include systems, methods, and/or devices for scaling adjustments with respect to a fractional subsystem in a wireless communications system. For example, a method for scaling parameters and/or timers with respect to a fractional subsystem in a wireless communications system may include: identifying a scaling factor for the fractional subsystem; identifying a parameter and/or a timer associated with the fractional subsystem; determining an adjustment associated with the parameter and/or timer based on the scaling factor; and/or applying the adjustment with respect to the parameter and/or timer for at least a portion of the fractional subsystem or another portion of the wireless communications system.

Some embodiments include a method for scaling adjustment with respect to a fractional subsystem in a wireless communications system. The method may include: identifying a scaling factor for the fractional subsystem; identifying at least a parameter or a timer associated with the fractional subsystem; determining an adjustment associated with at least the parameter or the timer based on the scaling factor; and/or applying the adjustment with respect to at least the parameter or the timer for at least a portion of the fractional subsystem or another portion of the wireless communications system.

Applying the adjustment with respect to at least the identified parameter or the identified timer may compensate for a time stretching of the identified parameter. Applying the adjustment may include inverse scaling at least the identified parameter or the timer. Some embodiments may include scaling at least the parameter or the timer associated with the fractional subsystem utilizing the scaling factor. In some embodiments, at least the parameter or the timer is relevant for an air interface of the fractional subsystem. Some embodiments may include identifying at least another parameter or another timer of the fractional subsystem. The adjustment with respect to at least the other parameter or the other timer may be eschewed.

In some embodiments, the parameter includes a QoS parameter. The QoS parameter may include at least a data rate or an end-to-end delay. Applying the adjustment may include adjusting the QoS parameter using the scaling factor associated with the fractional system to generate a scaled QoS parameter. Some embodiments may include negotiating a QoS configuration with a base station based on the scaled QoS parameter. Some embodiments may include transmitting a request based on the scaled QoS parameter. Some embodiments may include transmitting a response based on the scaled QoS parameter. The scaled QoS parameter may be the smaller of a subscribed QoS and a currently available QoS in the fractional subsystem.

In some embodiments, applying the adjustment occurs at a Radio Access Technology (RAT) application layer of the fractional subsystem. In some embodiments, applying the adjustment occurs at a MAC layer.

Some embodiments may include transmitting the unscaled QoS parameter from a base station to determine whether the mobile device has a subscription rate that supports the unscaled QoS parameter. In some embodiments, applying the adjustment includes: adjusting back a scaled QoS configuration to determine an unscaled QoS configuration; and/or determining whether a device is allowed the unscaled QoS configuration. Some embodiments may include utilizing one or more QoS configuration profiles to determine whether the device is allowed the unscaled QoS configuration.

In some embodiments, the parameter includes at least a slot cycle index, a slot cycle period, a Data Rate Control (DRC) index, a packet size, or a Data Source Channel (DSC) length. Applying the adjustment may include adjusting a slot cycle period using the scaling factor associated with the fractional system to generate a scaled slot cycle period. Applying the adjustment may include adjusting a slot cycle index using the scaling factor associated with the fractional system to generate a scaled slot cycle index. Applying the adjustment may include adjusting a data rate measurement unit associated with a Data Rate Control Index (DRX) using the scaling factor associated with the fractional system to generate a scaled data rate measurement unit. Applying the adjustment may include adjusting a number of slot packets based on the scaling factor associated with the fractional system to cap a transmission delay. Applying the adjustment may include adjusting a Data Source Channel (DSC) length using an inverse of the scaling factor associated with the fractional system to generate an inverse scaled DSC length.

The method for scaling adjustment with respect to the fractional subsystem in the wireless communications system may be performed by a mobile device, by a base station, and/or by a core network in some embodiments. The method for scaling adjustment with respect to the fractional subsystem in the wireless communications system may be performed by a wireless communications system, a wireless communications device, and/or computer program product that includes a non-transitory computer-readable medium that includes code for performing the method.

Some embodiments include a wireless communications system configured for scaling adjustments with respect to a fractional subsystem in the wireless communications system. The wireless communications system may include: a means for identifying a scaling factor for the fractional subsystem; a means for identifying at least a parameter or a timer associated with the fractional subsystem; a means for determining an adjustment associated with at least the parameter or the timer based on the scaling factor; and/or a means for applying the adjustment with respect to at least the parameter or the timer for at least a portion of the fractional subsystem or another portion of the wireless communications system.

In some embodiments, the means for applying the adjustment includes a means for inverse scaling at least the identified parameter or the timer. In some embodiments, the wireless communications system includes a means for scaling at least the parameter or the timer associated with the fractional subsystem utilizing the scaling factor. In some embodiments, the wireless communications system includes: a means for identifying at least another parameter or another timer of the fractional subsystem; and/or a means for eschewing the adjustment with respect to at least the other parameter or the other timer.

In some embodiments, the means for applying the adjustment includes a means for adjusting a QoS parameter using the scaling factor associated with the fractional system to generate a scaled QoS parameter. In some embodiments, the wireless communications system includes a means for negotiating a QoS configuration with a base station based on the scaled QoS parameter. In some embodiments, the wireless communications system includes a means for transmitting a request based on the scaled QoS parameter. In some embodiments, the wireless communications system includes a means for transmitting a response based on the scaled QoS parameter.

The means for applying the adjustment may include a means for applying the adjustment at a Radio Access Technology (RAT) application layer of the fractional subsystem. The means for applying the adjustment may include a means for applying the adjustment at a MAC layer.

Some embodiments include a wireless communications device configured for scaling adjustments with respect to a fractional subsystem in a wireless communications system. The wireless communications device may include at least one processor configured to: identify a scaling factor for the fractional subsystem; identify at least a parameter or a timer associated with the fractional subsystem; determine an adjustment associated with at least the parameter or the timer based on the scaling factor; and/or apply the adjustment with respect to at least the parameter or the timer for at least a portion of the fractional subsystem or another portion of the wireless communications system.

In some embodiments, the least one processor configured to apply the adjustment may be configured to: adjust back a scaled QoS configuration to determine an unscaled QoS configuration; and/or determine whether a mobile device is allowed the unscaled QoS configuration. The at least one processor may be configured to utilize one or more QoS configuration profiles to determine whether the device is allowed the unscaled QoS configuration.

In some embodiments, the at least one processor configured to apply the adjustment may be configured to adjust a slot cycle period using the scaling factor associated with the fractional system to generate a scaled slot cycle period. The at least one processor configured to apply the adjustment may be configured to adjust a slot cycle index using the scaling factor associated with the fractional system to generate a scaled slot cycle index. The at least one processor configured to apply the adjustment may be configured to adjust a data rate measurement unit associated with a Data Rate Control Index (DRX) using the scaling factor associated with the fractional system to generate a scaled data rate measurement unit. The at least one processor configured to apply the adjustment may be configured to adjust a number of slot packets based on the scaling factor associated with the fractional system to cap a transmission delay. The at least one processor configured to apply the adjustment may be configured to adjust a Data Source Channel (DSC) length using an inverse of the scaling factor associated with the fractional system to generate an inverse scaled DSC length.

Some embodiments include a computer program product for scaling adjustments with respect to a fractional subsystem in a wireless communications system that includes a non-transitory computer-readable medium that may include: code for identifying a scaling factor for the fractional subsystem; code for identifying at least a parameter or a timer associated with the fractional subsystem; code for determining an adjustment associated with at least the parameter or the timer based on the scaling factor; and/or code for applying the adjustment with respect to at least the parameter or the timer for at least a portion of the fractional subsystem or another portion of the wireless communications system.

The non-transitory computer-readable medium may include code for adjusting a QoS parameter using the scaling factor associated with the fractional system to generate a scaled QoS parameter. The non-transitory computer-readable medium may include code for negotiating a QoS configuration with a base station based on the scaled QoS parameter. The non-transitory computer-readable medium may include: code for adjusting back a scaled QoS configuration to determine an unscaled QoS configuration; and/or code for determining whether a device is allowed the unscaled QoS configuration. The non-transitory computer-readable medium may include: code for utilizing one or more QoS configuration profiles to determine whether the device is allowed the unscaled QoS configuration. The non-transitory computer-readable medium may include code for applying the adjustment at a Radio Access Technology (RAT) application layer of the fractional subsystem.

The foregoing has outlined rather broadly the features and technical advantages of examples according to disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 10A shows a table that may reflect the relationship between slot cycle and period.

FIGS. 10B and 10C show tables that reflect different slot cycle index or period scaling in accordance with various embodiments;

DETAILED DESCRIPTION

Figure 1:
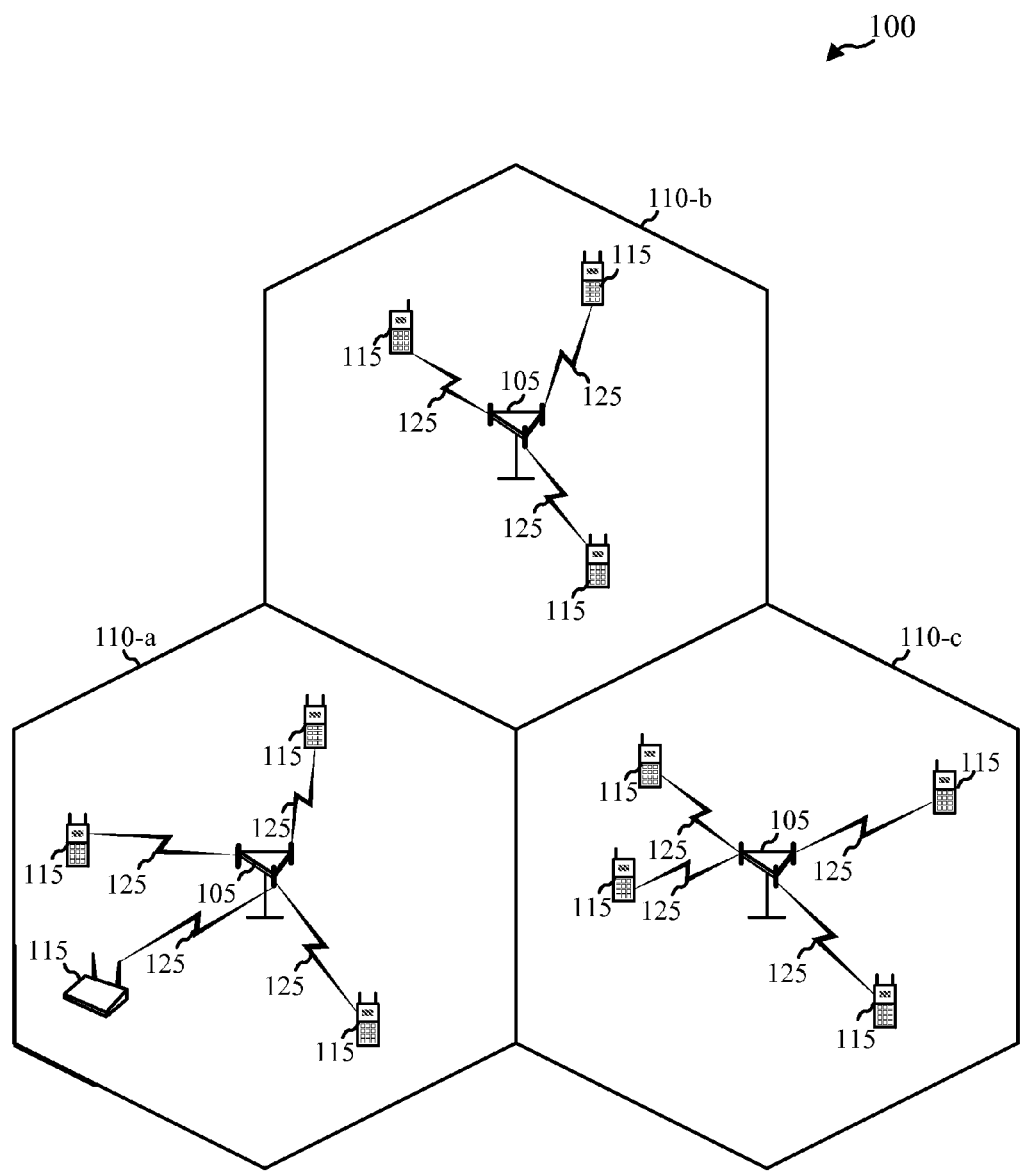
FIG. 1 shows a block diagram of a wireless communications system in accordance with various embodiments.
Figure 1:
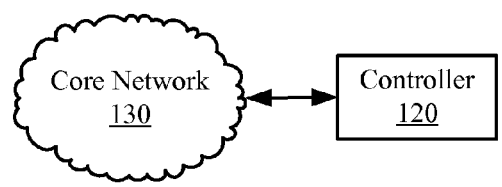

Embodiments provide methods, systems, and/or devices that may allow for inverting or scaling the effects of time stretching associated with the use of fractional waveforms. A fractional waveform is a waveform that may occupy less bandwidth than a normal waveform, though in some embodiments, a fractional waveform may occupy more bandwidth than a normal waveform. For example, at a band edge, there may not be enough available spectrum to place a normal waveform. In a fractional bandwidth system, the same number of symbols and bits may be transmitted over a longer duration compared to a normal bandwidth (BW) system. This results in "time stretching" whereby slot duration, frame duration, etc., may increase by a factor N, where N is the ratio of the normal BW to fractional BW. Thus, data rate in a fractional BW system is (Normal Rate×1/N), and delay is (Normal Delay×N). Therefore, the application may need to request higher rate and lower delay over air interface in a fractional BW system. However, it may not be desirable for applications/application servers to change for using the fractional BW system versus the normal BW system. Thus, there may be a need to do QoS scaling. Similarly, slot cycle index and some other time-sensitive parameters might need to be scaled to keep the user experience at par with a normal BW system.

To handle the effects of scaling associated with fractional bandwidth systems, different adjustments may be made. For example, to maintain certain QoS requirements, some embodiments may utilize QoS from the fractional bandwidth system. Due to time stretching, it may be necessary to request a higher rate and lower delay over air interface in a fractional system, for example. In some embodiments, an application on a mobile device or application server, for example, may make a request based on these scaled QoS requirements. However, it may not be desirable for applications and/or application servers to change for using the fractional system versus the normal system. Instead, in some embodiments, the fractional system (or the fractional system's protocol layers) may scale the application QoS requirements.

Some embodiments include systems, methods, and/or devices for scaling adjustments with respect to a fractional subsystem in a wireless communications system. For example, a method for scaling adjustments with respect to one or more parameters and/or timers with respect to a fractional subsystem in a wireless communications system may include: identifying a scaling factor for the fractional subsystem; identifying a parameter and/or a timer associated with the fractional subsystem; determining an adjustment associated with the parameter and/or timer based on the scaling factor; and/or applying the adjustment with respect to the parameter and/or timer for at least a portion of the fractional subsystem or another portion of the wireless communications system.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 may cover IS-2000, IS-95, IS-856 standards, and successor standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base stations 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-$a$, 110-$b$, or 110-$c$. The coverage area for a base station may be divided into sectors (not shown, but making up only a portion of the coverage area). The system 100 may include base stations 105 of different types (e.g., macro, micro, femto, and/or pico base stations). As used herein, the term "cell" may refer to 1) a sector, or 2) a site (e.g., a base station 105). Thus, the term "macrocell" may refer to 1) a macrocell sector, 2) a macrocell base station (e.g., macrocell base station 105), and/or 3) a macrocell controller. Thus, the term "femtocell" may refer to 1) a femtocell sector, or 2) a femtocell base station (e.g., femtocell access point).

For the discussion below, the mobile devices 115 may operate on (are "camped on") a macro or similar network facilitated by multiple base stations 105. Each base station 105 may cover a relatively large geographic area (e.g., hundreds of meters to several kilometers in radius) and may allow unrestricted access by terminals with service subscription. A portion of the mobile devices 115 may also be registered to operate (or otherwise allowed to operate) in smaller areas, such as femtocells, within the coverage area of a macrocell base station 105.

The different aspects of system 100, such as the mobile devices 115, the base stations 105, the core network 130, and/or the controller 120 may be configured to utilize fractional bandwidth and waveforms in accordance with various embodiments. System 100, for example, shows transmissions 125 between mobile devices 115 and base stations 105. The transmissions 125 may include uplink transmission, from a mobile device 115 to a base station 105, and/or downlink transmissions, from a base station 105 to a mobile device 115. The transmissions 125 may include fractional and/or normal waveforms. Normal waveforms may also be referred to as legacy and/or standard waveforms.

Different aspects of system 100 may utilize portions of spectrum that may not be big enough to fit a standard waveform. System 100 may also utilize portions of spectrum that may be bigger than what a standard waveform may fit. Devices such as the mobile devices 115, the base stations 105, the core network 130, and/or the controller 120 may be configured to utilize scaling factors to generate and/or utilize fractional bandwidth and/or waveforms. In some cases, these devices may generate fractional waveforms to fit these portions of spectrum that a normal, legacy, and/or standard waveform may not fit. Some aspects of system 100 may form a fractional subsystem (such as certain mobile devices 115 and/or base stations 105) that may be generated with respect to a normal subsystem (that may be implemented using other mobile devices 115 and/or base stations 105) through dilating, or scaling down (or up), the time of the fractional subsystem with respect to the time of the normal subsystem. Scaling may also be applied to states and/or frequencies of the different subsystems.

Aspects of system 100 (e.g., mobile devices 115, base stations 105, core network 130, controller 120) may also be configured to invert or scale the effects of time stretching associated with the use of fractional bandwidth and/or subsystems through scaling adjustment. For example, the mobile devices 115, base stations 105, and/or core network 130 may be configured to make scaling adjustments with respect to a fractional subsystem within system 100 that may include: identifying a scaling factor for the fractional subsystem; identifying a parameter and/or a timer associated with the fractional subsystem; determining an adjustment associated with the parameter and/or timer based on the scaling factor; and/or applying the adjustment with respect to the parameter and/or timer for at least a portion of the fractional subsystem or another portion of the wireless communications system.

Figure 2A:
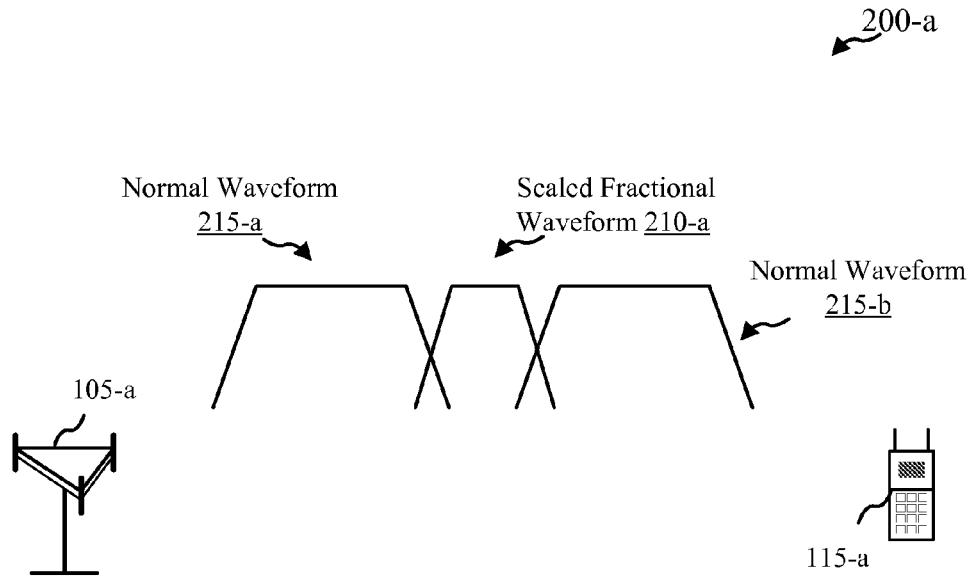
FIG. 2A shows an example of a wireless communications system where a fractional waveform fits into a portion of spectrum not broad enough to fit a normal waveform in accordance with various embodiments.
Figure 2B:
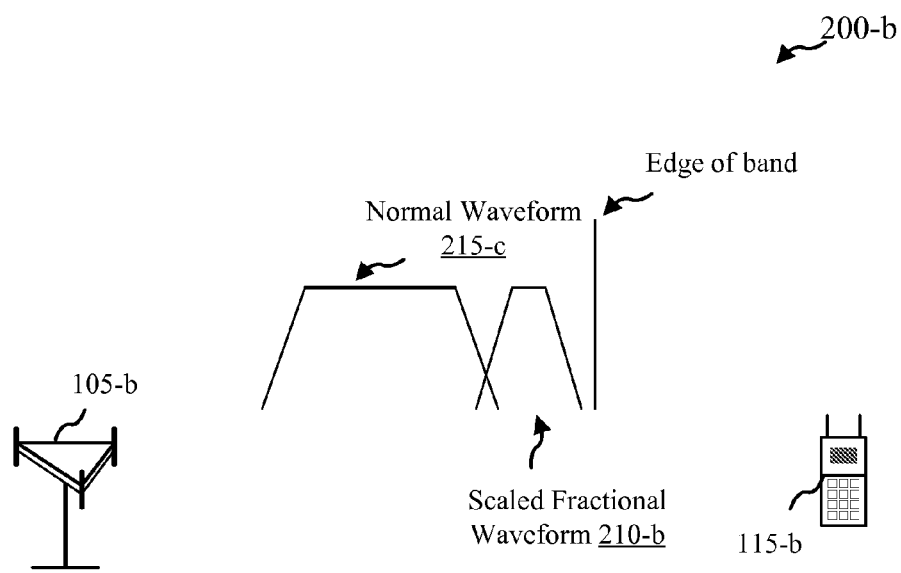
FIG. 2B shows an example of a wireless communications system where a fractional waveform fits into a portion of spectrum near an edge of a band in accordance with various embodiments.

As mentioned above, fractional subsystems may be utilized to generate fractional waveforms that occupy less bandwidth than a normal waveform. For example, at a band's edge, there may not be enough available spectrum to place a normal waveform. For a fractional subsystem, as time gets dilated, the frequency occupied by a waveform may go down, thus making it possible to fit a fractional waveform into spectrum that may not be broad enough to fit a normal waveform. FIG. 2A shows an example of a wireless communications system 200-a, which may be an example of system 100 of FIG. 1, with a base station 105-a and a mobile device 115-a, where a fractional waveform 210-a fits into a portion of spectrum not broad enough to fit a normal waveform, such as normal waveforms 215-a and/or 215-b. These waveforms may be part of one or more transmissions 125 as shown in FIG. 1, for example. FIG. 2B shows an example of a wireless communications system 200-b, which may be an example of system 100 of FIG. 1, with a base station 105-b and mobile device 115-b, where a fractional waveform 210-b that may fit into a portion of spectrum near an edge of a band, which may be a guard band, where a normal waveform such as waveform 215-c may not fit. These waveforms may be part of one or more transmissions 125 as shown in FIG. 1, for example.

As discussed above, a fractional waveform may be a waveform that may occupy less bandwidth (or more bandwidth in some cases) than a normal waveform. Thus, in a fractional bandwidth system, the same number of symbols and bits may be transmitted over a longer duration compared to a normal bandwidth system. This may result in time stretching, whereby slot duration, frame duration, etc., may increase by a scaling factor N. Scaling factor N may represent the ratio of the normal bandwidth to fractional bandwidth (BW). Thus, data rate in a fractional bandwidth system may equal (Normal Rate×1/N), and delay may equal (Normal Delay×N). In general, a fractional systems channel BW=channel BW of normal systems/N. Delay×BW may remain unchanged.

Some embodiments may utilize other scaling factors. For example, some embodiments may determine and/or generate dilated units D (which may be referred to as a dilated time unit) and/or reduced units R (which may be referred to as a reduced frequency unit). Both the D and R unit may be unitless. Dilated unit D may have the value N. Time in the fractional system may be referred to in terms of "dilated time". For example, a slot of say 10 ms in normal time may be 10 Dms in fractional time (note: even in normal time, this will hold true since N=1 in normal time: D has a value of 1, so 10 Dms=10 ms). In time scaling, some embodiments may replace most "seconds" with "dilated-seconds". Some embodiments may utilize reduced unit R that may be equal to 1/N. For example, frequency may be RHz. Carrier frequency may not be scaled. For example, power control may be 800 RHz. Chip rate may be 1.2288 McpDs or 1.2288 MRHz (or RMHz), for example. Fractional subsystems may utilize dilated units D and/or reduced units R to represent and/or provide relationships between different aspects of different fractional and/or normal subsystems.

Throughout this specification, the term normal system, subsystem, and/or waveform may be utilized to refer to systems, subsystems, and/or waveforms that involve embodiments that may utilize a scaling factor that may be equal to one (e.g., N=1). These normal systems, subsystems, and/or waveforms may also be referred to as standard and/or legacy systems, subsystems, and/or waveforms. Furthermore, fractional systems, subsystems, and/or waveforms may be utilized to refer to systems, subsystems, and/or waveforms that involve embodiments that may utilize a scaling factor that may be not equal to one (e.g., N=2, 4, 8, ½, ¼, etc). For N>1, the bandwidth of a waveform may decrease. Some embodiments may utilize scaling factors that increase the bandwidth. For example, if N<1, then a waveform may be expanded to cover bandwidth larger than a standard waveform. Fractional systems, subsystems, and/or waveforms may also be referred to as flexible systems, subsystems, and/or waveforms in some cases. Fractional systems, subsystems, and/or waveforms may or may not change bandwidth, for example. A fractional system, subsystem, or waveform may be flexible because it may offer more possibilities than a normal system, subsystem, or waveform (e.g., N=1 system). Scaling factors may also take on irrational values in some cases. Scaling factors may also take on negative values in some situations.

Figure 3:
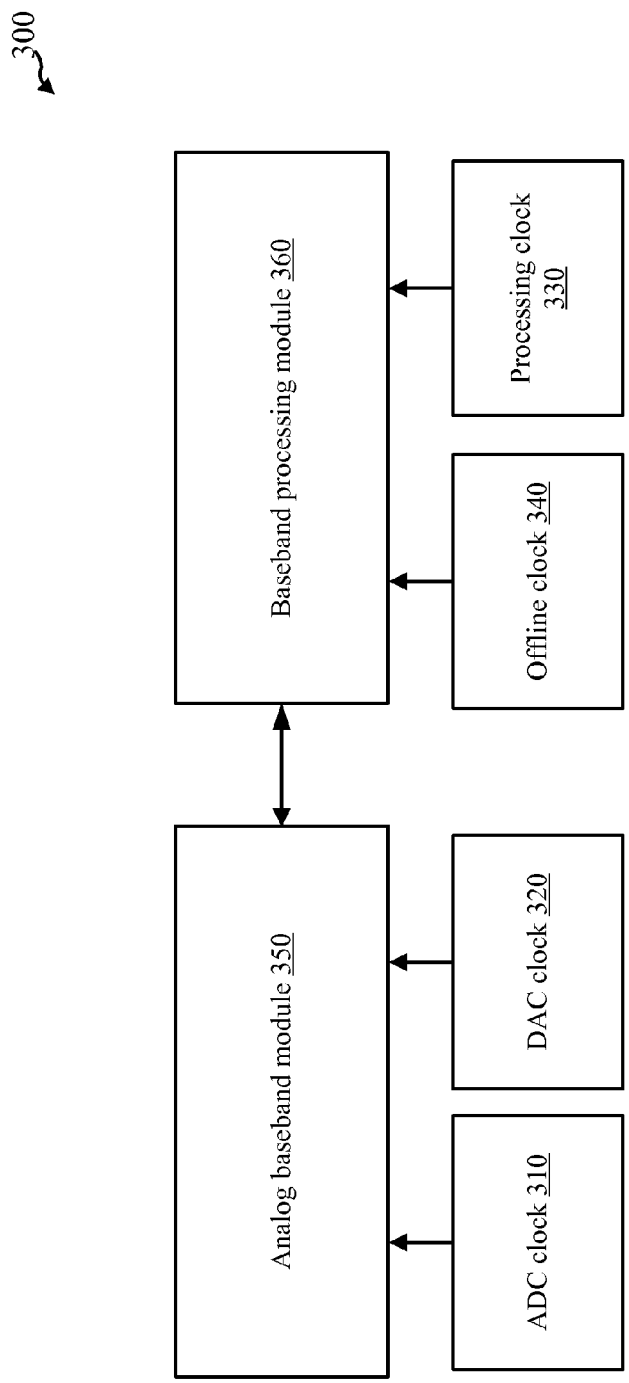
FIG. 3 shows an example of a systems clocks regime in accordance with various embodiments.

Mobile devices and/or base stations, such as mobile devices 115 and/or base stations 105 of FIGS. 1 and/or 2 may be configured to operate in dual mode (normal and fractional). Upon receiving a request for service from a mobile device, for example, the base station may determine that the mobile device can use a fractional bandwidth waveform. The base station may send the center frequency and/or the scaling factor for the fractional bandwidth to the mobile device. The mobile device may tune to the new channel and utilize the scaling factor accordingly to receive service. The mobile device may configure itself to communicate on the fractional bandwidth channel. In some embodiments, a mobile device and/or base station may change the frequencies of the ADC clock 310, DAC clock 320, processing clock 330, and/or the offline clock 340 as shown in a system clocks regime 300 in FIG. 3 to utilize fractional bandwidth waveforms. Systems clocks regime 300 also shows an analog baseband module 350 in communication with the ADC clock and/or DAC clock 320. The analog baseband module 350 may be in communication with a baseband processing module 360 that may be in communication with the offline clock 340 and/or processing clock 330. These clocks 310-340 may control the block processing rate, interrupt rate, decimation rate, and/or interpolation rate, for example. In some embodiments, the offline clock 340 may not be changed. In some embodiments, the effective output of the ADC 310 and DAC 320 clocks may be changed by filtering and keeping the ADC clock 310 and DAC clock 320 the same. In some cases, the ADC clock 310 may be kept the same and decimate every other sample. For example, the DAC clock 320 may be kept the same and feed it two (e.g., repeated) of the same sample (maybe even filtered). This may have the same effect as slowing the clock down by 2 for an N=2 system. Some embodiments may not include an offline clock 340. Some implementations may include a processing clock 330. The processing clock 330 may not be in an offline mode. The processing clock 330 may be slowed down or not.

The base station may be simultaneously transmitting normal and fractional channels in some embodiments. Similarly, the mobile device may simultaneously transmit normal and fractional channels. The fractional channel may be generated by utilizing the scaling factor and could be of the same or different radio technology. Both channels may contain data and/or signaling. The signaling may be used to configure the mobile devices camped and/or attached to those channels. Signaling may also be used to manage the mobile device movement between the two channels.

The use of fractional bandwidth waveforms has many applications including, but not limited to, machine-to-machine, small cell deployment (Femto, Pico, Metro, etc.), roll out of 3G services over 2G spectrum (GSM re-framing), moderate data rate services, and/or voice services.

Figure 4A:
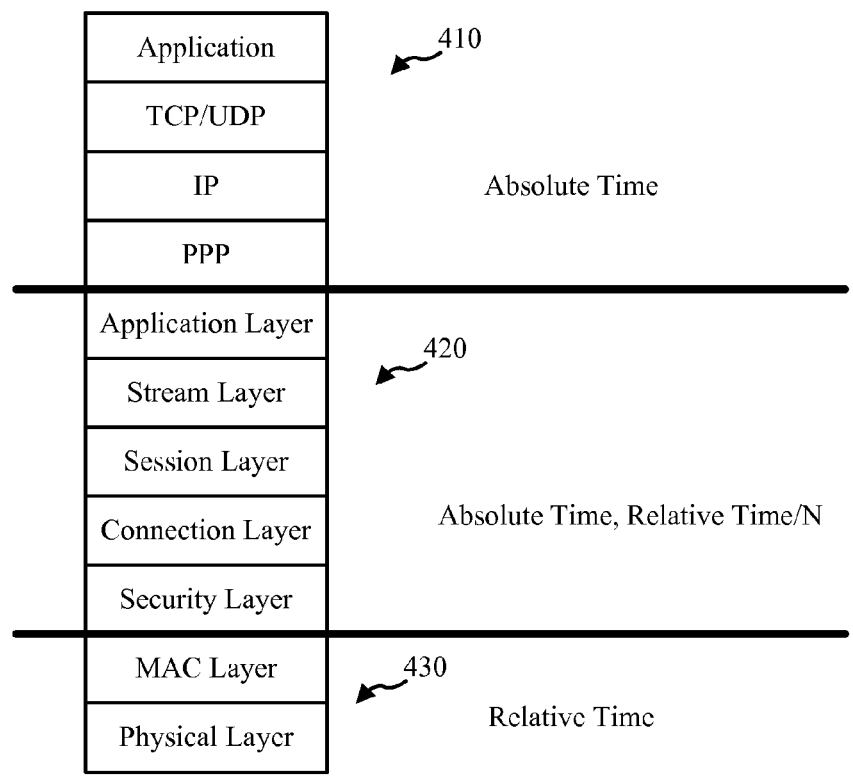
FIGS. 4A, 4B, and 4C show examples of different senses of time across protocol layers in accordance with various embodiments.

FIG. 4A shows one example of a sense of time across protocol layers 400-a. This example illustrates an EVDO protocol stack, though other embodiments may utilize other Radio Access Technology (RAT) protocol stacks or layers accordingly. In general, FIG. 4A shows a top set 410 of protocol layers, which may be associated with the upper layers of an OSI protocol stack, TCP/IP protocol stack, etc. The top set 410 generally utilizes absolute time. The middle set 420 of protocol layers is generally related to protocol layers associated with the RAT. These layers may utilize both absolute time and relative time with respect to a time scaling factor N for a fractional system. In some cases, the middle set 420 may be referred to as the fractional systems protocol stack or layers. The bottom set 430 of layers generally includes layers that utilize relative time. For example, the MAC and Physical layers generally use relative time that is the native time of the underlying air interface.

Figure 4B:
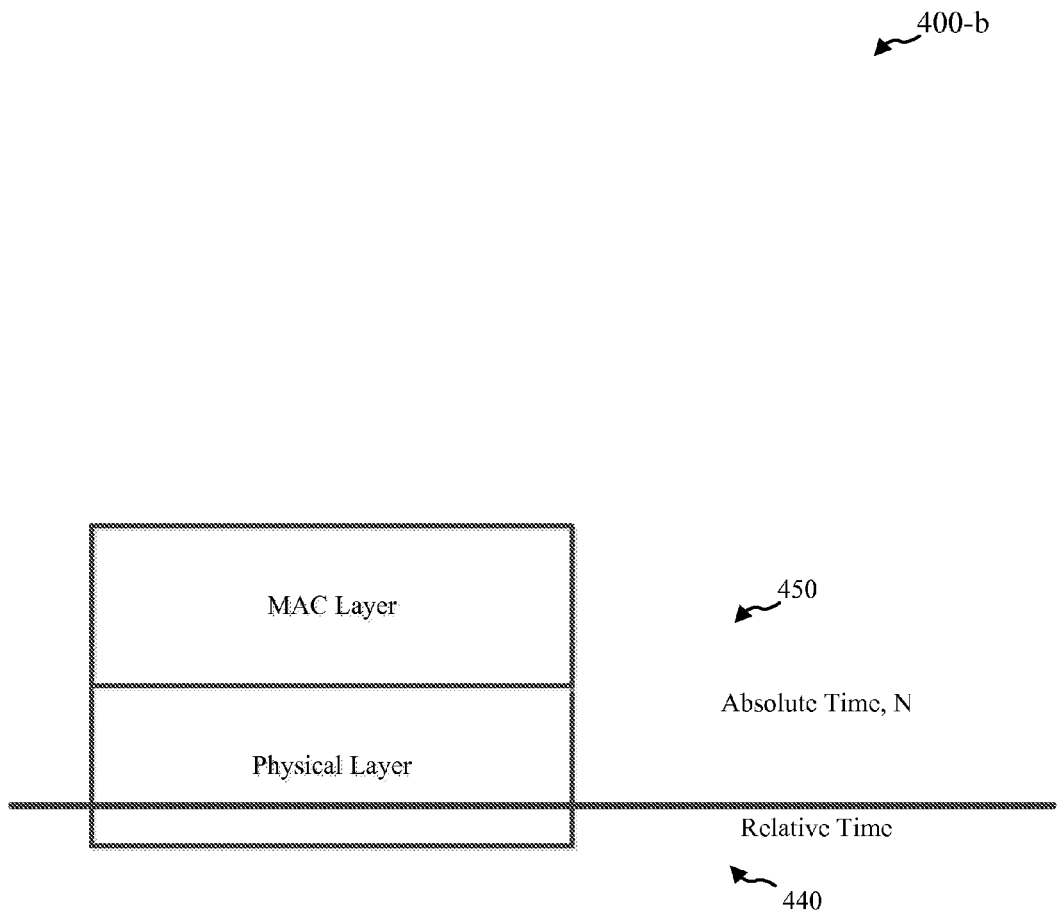
Figure 4C:
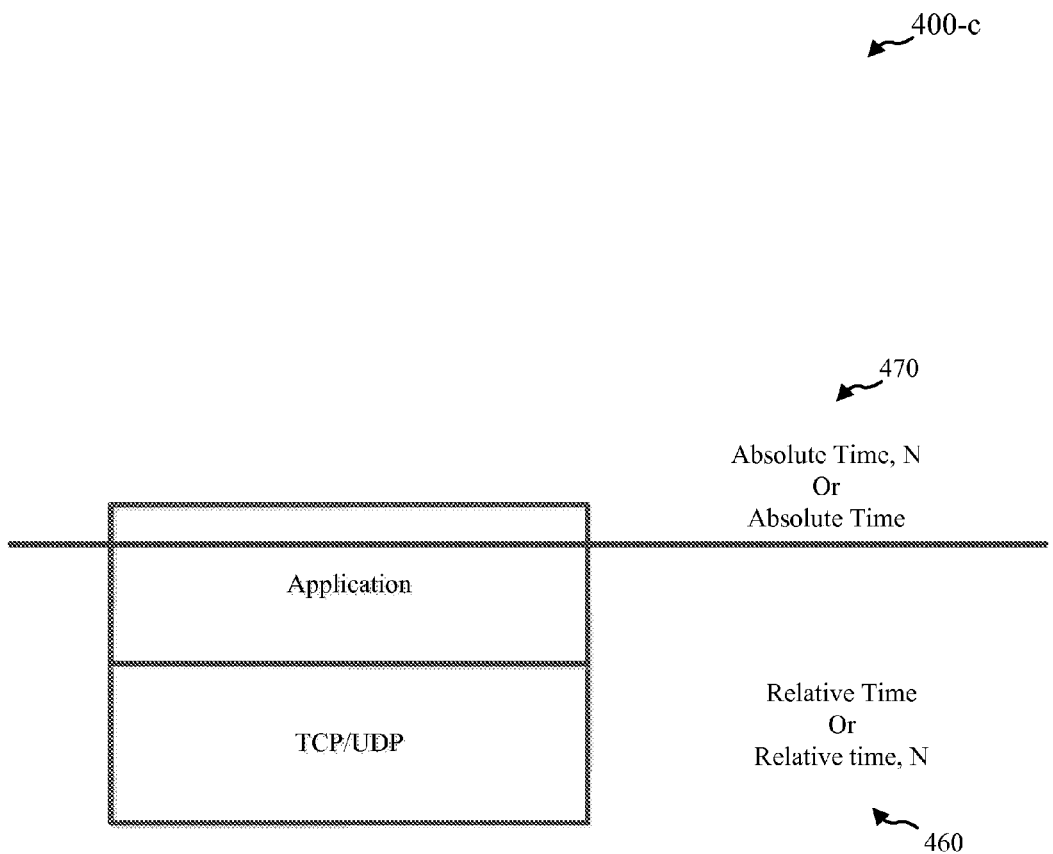

Though FIG. 4A shows the demarcation of relative time and absolute time between the layers shown, other demarcation may be equally valid. For example, the demarcation of time can be kept at the lowest of levels. FIG. 4B shows another example of a sense of time across protocol layers 400-b where relative time 440 could be kept only at the state of the codes (e.g., PN codes). The correct value of the relative time (and PN code state, for example) may be loaded every chip after being corrected from the absolute time 450. FIG. 4C shows another example of a sense of time across protocol layers 400-c where every block 460 and/or 470 may know about relative time and calculates absolute time as needed. In protocol layers 400-c, even the applications may be aware of the relative time and must calculate the absolute time (e.g., to display time on the UI) as needed.

Some embodiments may involve a parameter that may be classified in different ways. For example, some parameters may be insensitive to time stretching. Some of these parameters may or may not have their performance affected by the time stretching. For example, parameters with value in slots may not need explicit scaling as they may be by default stretched in a fractional system as the slot duration itself is stretched. While the functionality may not break, for enhanced performance and user experience, inverse scaling may be done (e.g., slot cycle or DSCLength) to make the value at par with a normal system. Several other examples of parameters that may be insensitive to time stretching include, but are not limited to, parameters with value in dB (i.e., relative power but not absolute power), parameters with unit less values (ratios), and/or parameters with value in % (e.g., FER).

Some parameters may be sensitive to time stretching. For example, these parameters may include, but are not limited to, parameters with value in data rate, parameters with value in time, and/or parameters related to QoS. In addition, parameters with respect to absolute power may be sensitive to time stretching (e.g., parameters measured in dBm).

To handle the effects of scaling associated with fractional systems, different adjustments may be made. For example, to maintain certain QoS requirements, some embodiments may utilize QoS from the fractional system. Due to time stretching, it may be necessary to request a higher rate and lower delay over air interface in a fractional system. Merely by way of example, consider a case where a desired application data rate may be 100 kbps and end-to-end delay may be 100 ms. For this example, let Fractional BW factor or time scaling factor N=2. The unit of time in time stretched system may be Dilated sec or Dilated ms (i.e., dilation factor is N. This also works for the normal system where dilation factor is N=1. For example, without QoS scaling, the effective application data rate=100/N=50 kbps and delay=100 Dms (Dilated ms) i.e. 100*N ms=200 ms. The scaled QoS requirements may then include a desired application data rate=100*2=200 kbpDs and/or desired end-to-end delay=100/2=50 Dms. Since the fractional system's lower layers may have no distinction between normal time and dilated time (i.e., they may think dilated time is the normal time), the requested rate would appear as 200 kbps (i.e. higher and desired end-to-end delay would appear as 50 ms i.e. lower). Scaling may be required in both Forward (Downlink) and Reverse Links (Uplink).

In some embodiments, an application on the mobile device or application server may make a request based on these scaled QoS requirements. However, it may not be desirable for applications and/or application servers to change for using the fractional system versus the normal system. Instead, in some embodiments, the fractional system (or the fractional system's protocol layers) may scale the application QoS requirements.

In some embodiments, QoS scaling may occur before assigning a Radio Link Protocol (RLP) flow that is appropriate for the scaled QoS requirement. RLP parameters may be decided based on the QoS requirements and negotiated between a mobile device and an Access Network. In some embodiments, scaling may affect attributes like Peak rate, Max-latency, Packet Size, Token Rate but not attributes like Traffic class, Delay_Variation_Sensitive, Max IP Packet Loss Rate, merely by way of example.

Figure 5:
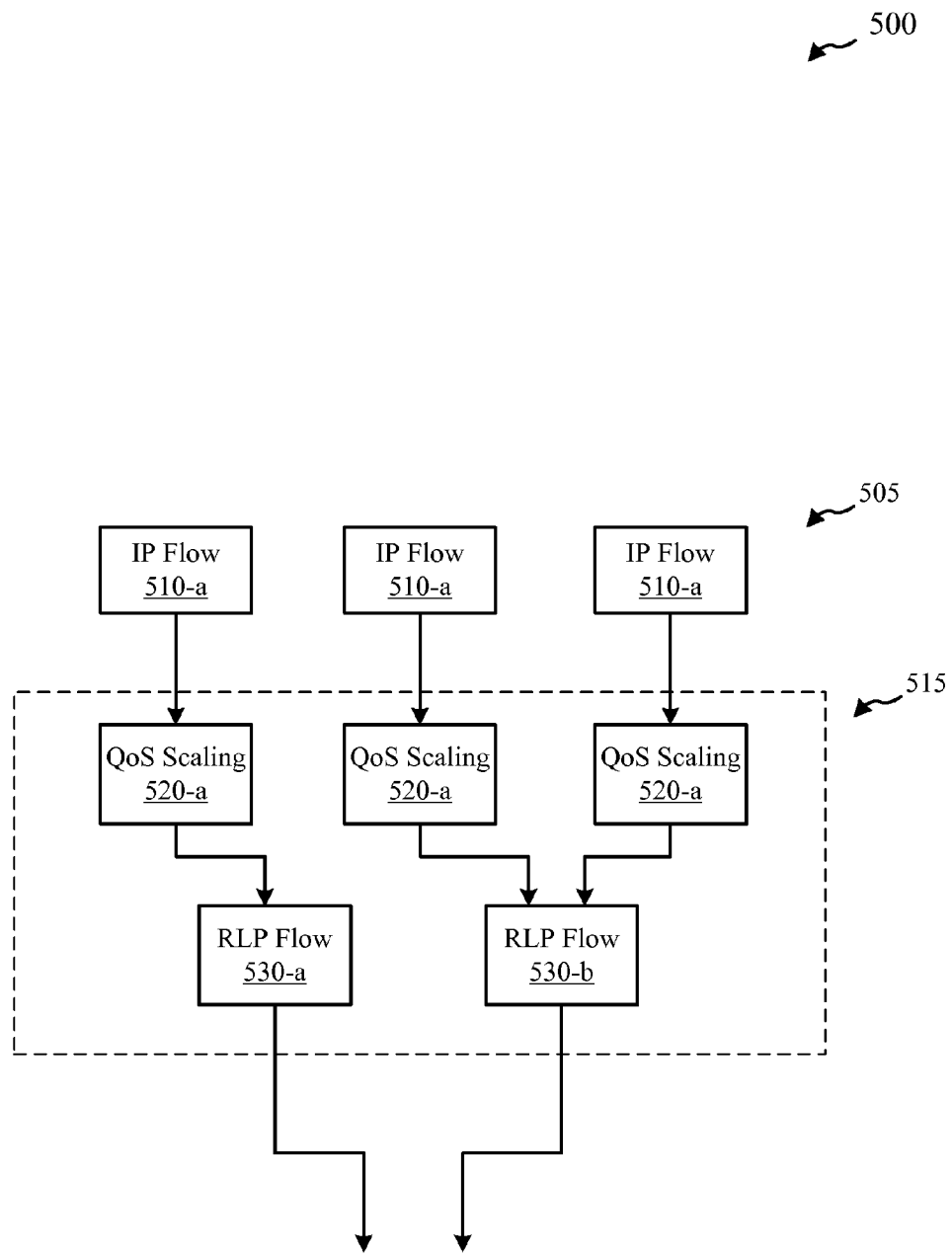
FIG. 5 shows an example of how different protocol layers may be utilized to implement quality of service ("QoS") scaling in accordance with various embodiments.

FIG. 5 shows one example of a system 500 where QoS scaling may be implemented in accordance with various embodiments. FIG. 5 shows a modified multi-flow packet application 515 that may provide a mechanism to define multiple application data flows that can be associated with QoS profiles. These flows may be identified using ReservationLabels. For example, a ReservationLabel may be an identifier that indicates the application data flow, QoS profile, and/or RLP flow associated with it. ReservationLabel of '11111111' may correspond to best effort RLP for example. Other ReservationLabels may correspond to other profiles.

In some embodiments, the multi-flow packet application 515 may provide multiple octet streams between a base station and a mobile device. Each octet stream may be carried by an RLP flow. RLP packets may be tagged with an RLPID that identifies the RLP flow.

In general, multi-flow packet application may be implemented as part of the protocol stack of the fractional system. In this example, it is the application layer of 1×EV-DO protocol stack. The multi-flow packet application 515 may provide mappings between IP flows 510 coming from an OSI application layer 505 to the RLP flows 530. With a modified multi-flow packet application 515 as shown in FIG. 5, QoS scaling modules 520 may be inserted before the mapping happens between the IP flows 510 and the RLP flows 530. These QoS scaling modules 520 may know the value N with respect to the fractional system and the QoS required by the application layer. The QoS scaling modules 520 may then map the QoS requirements from the normal system to the fractional system to handle QoS scaling within the fractional system. The QoS scaling modules 520 may map scaled QoS requirements for application data flow to QoS Profiles. Thus, the QoS scaling module 520 may scale up the data rate or scale down the delay requirement to invert the impact of time stretching for example. In one example, if the data rate required is 100 kbps, the QoS scaling module 520 may scale this to 200 kbpDs if N=2, or 100 kpbs. If the desired delay is 100 ms, then for N=2, then the QoS scaling module may scale the requested rate to 50 Dms or 100 ms. QoS classes are sometimes fixed. In the example where N=2 and one originally wanted 100 kbps and 100 ms delay, a class may not exist where the QoS is 200 kbps and 50 ms. There may only be a QoS that is 250 kpbs and 25 ms, for example. In that case, the QoS requested may be that class and the resulting QoS would be 250 kbpDs and 25 Dms (which is 125 kbps and 50 ms).

Other aspects of the modified multi-flow application layer 515 may remain the same. For example, the mobile device may bind data flow(s) 510 to RLP flow(s) 530 and assigns ReservationLabel(s). The mobile device may send ReservationLabel(s) and QoS Profile ID(s) to the base station. The base station may accept ReservationLabel(s) bound to an RLP flow, configure and activate RLP flow(s), bind RLP flow(s) to RTCMAC flow, and/or configure and activate RTCMAC flows.

QoS negotiation may be between a mobile device and the base station. It may be desirable not to impact Packet Data Service Node (PDSN) and other core network (CN) entities with the fact that the air interface may be the fractional system. However, due to QoS scaling, the mobile device might request a QoS profile ID for an application flow that it is not authorized for or is not pre-configured. For example, a mobile device may have a subscription that allows a data rate of 100 kbps; however, with a fractional system with N=2 for example, it may end up requesting 200 kbpDs as discussed above in order to maintain the 100 kpbs QoS requirement.

Some embodiments may involve the fractional base station creating and maintaining dummy pre-configured profile IDs that are scaled versions of the pre-configured profile IDs. The scaled QoS profile ID may be used in the context of the air link portion only. The base station, when checking a subscription rate for the mobile device, may then use the unscaled profile. For example, if the base station checked for scaled up QoS Profile id, it would lead to errors. The base station may scale back the profile ID to check whether the mobile device is allowed for the scaled back QoS Profile ID as that is the effective rate the mobile device is being serviced.

In some embodiments, the QoS scaling may be handled at the MAC layer rather than with a QoS scaling or mapping module as part of a modified multi-flow packet application. The MAC layer in general has a notion of relative time, with respect to the fractional systems value N. The MAC layer, while doing the scheduling, may take into account the effect of N and schedule the flows accordingly. For example, the data rate and inter-packet delay may need to be maintained as per the QoS requirement. Because of relative timing being stretched, these would imply that the MAC layer may schedule the flows more frequently in relative time compared to N=1 system.

Some embodiments may be configured to handle QoS requirements for a mobile device as it moves between base stations. The following example is discussed with respect to UMTS but may be applicable to other RATs.

Figure 6:
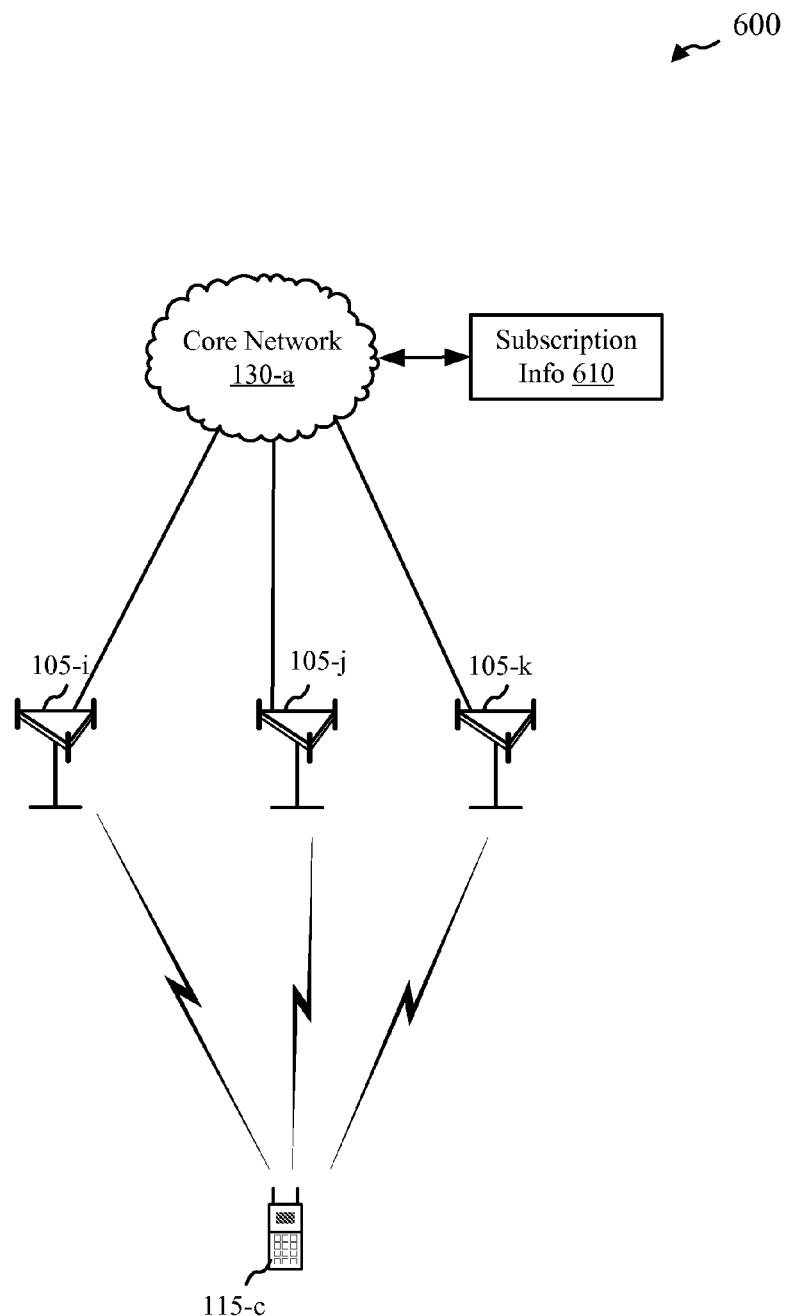
FIG. 6 shows an example of a wireless communications system in accordance with various embodiments.

FIG. 6 shows an example of a wireless communications system 600 that includes mobile device 115-c and multiple base stations 105-i, 105-j, . . . , 105-k (or in communication with a core network 130-a that may have access to subscriber information 610, such as subscribed QoS for the mobile device). System 600 may be an example of system 100 of FIG. 1, for example. The base station may normally be capable of supporting the subscribed QoS. This might not be the case when a mobile device moves between base stations with different fractional bandwidth.

Some embodiments may be configured to seek a QoS scaling mechanism such that:

$$QoS_{allocated} = \min\{QoS_{sub}, QoS_i\}$$

where $QoS_{sub}$=subscribed QoS, $QoS_i$=QoS available to base station i.

The mobile device 115-c may make a QoS request to the CN 130-a (i.e., SGSN) but not to one of base stations 105 (i.e., controller or RNC) in some cases. But the available QoS information by base station i (QoSi) may be known to base station i only. The CN 130-a may not know base station i's available QoS, QoSi.

To address how to make the QoS scaling and allocation mechanism accurate and streamlined, several different procedures may be utilized. Some embodiments may utilize a RAB Assignment Procedure (see, e.g., Section 12.7.4 in TS 23.060). The Radio Access Network (RAN) may return a RAB Assignment Response message to the SGSN. If the request to establish or modify one or several RABs has been queued, the RAN may report the outcome of the establishment or modification in subsequent RAB Assignment Response messages. If the SGSN receives a RAB Assignment Response message with a cause indicating that the requested QoS profile(s) cannot be provided (e.g., "Requested Maximum Bit Rate not Available"), then the SGSN may send a new RAB Assignment Request message with different QoS profile(s). The number of re-attempts, if any, as well as how the new QoS profile(s) values may be determined may be implementation dependent.

Figure 7:
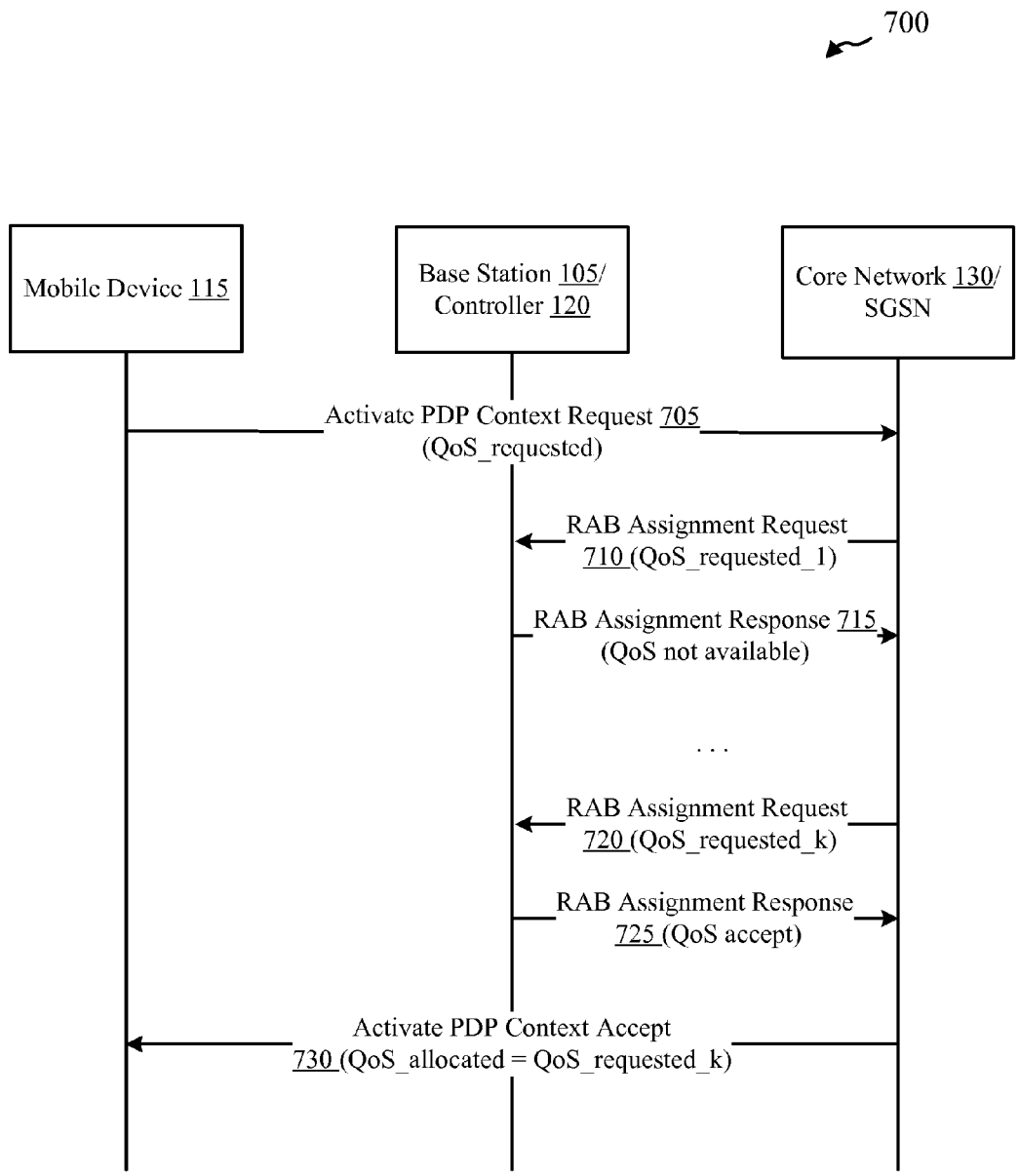
FIG. 7 shows a communications diagram involving a mobile device, a base station, and a core network.

FIG. 7 shows a communication diagram 700 that may include the core network 130/SGSN downgrading QoS until accepted by the base station 105. Communications diagram 700 may be implemented through systems such as system 100 of FIG. 1 and/or system 600 of FIG. 6, for example. QoS_allocated can be less than QoSi (as core network 130 does not know available QoSi). The core network 130 may declare failure before getting accepted by the base station 105 (depending on the implementation). As shown in communications diagram 700, the mobile device 115 may transmit an Activate PDP Context Request (QoS_requested) 705 to the core network 130/SGSN to request QoS_requested, requested QoS by the mobile device 115. The core network 130/SGSN may determine a QoS_requested_1 based on QoS_sub and core network 130' are source availability, etc. The core network 130/SGSN may then transmit a RAB Assignment Request (QoS_requested_1) 710 to the base station 105/controller 120. The base station 105/controller 120 may transmit a RAB Assignment Response (QoS not available) 715 if the QoS_requested_1 is not available. The core network 130/SGSN may scale down the QoS request without knowing the base station 105's QoS availability. This back and forth between the core network 130/SGSN and base station 105/controller 120 may be iterated numerous times. The core network 130/SGSN may send a RAB Assignment Request (QoS_requested_k) 720 that the base station 105/controller 120 may accept with a RAB Assignment Response (QoS accept) 725. The core network 130/SGSN may then transmit an Activate PDP Context Accept (QoS_allocated=QoS_requested_k) 730 to the mobile device 115 to allocate the QoS negotiated between the core network 130/SGSN and base station 105/controller 120. The number of iteration could be reduced if the core network 130/SGSN is aware of the time scaling factor N associated with base station i and scales down the QoS request accordingly (e.g., more aggressive scaling for a large N and more conservative scaling for a small N).

Figure 8:
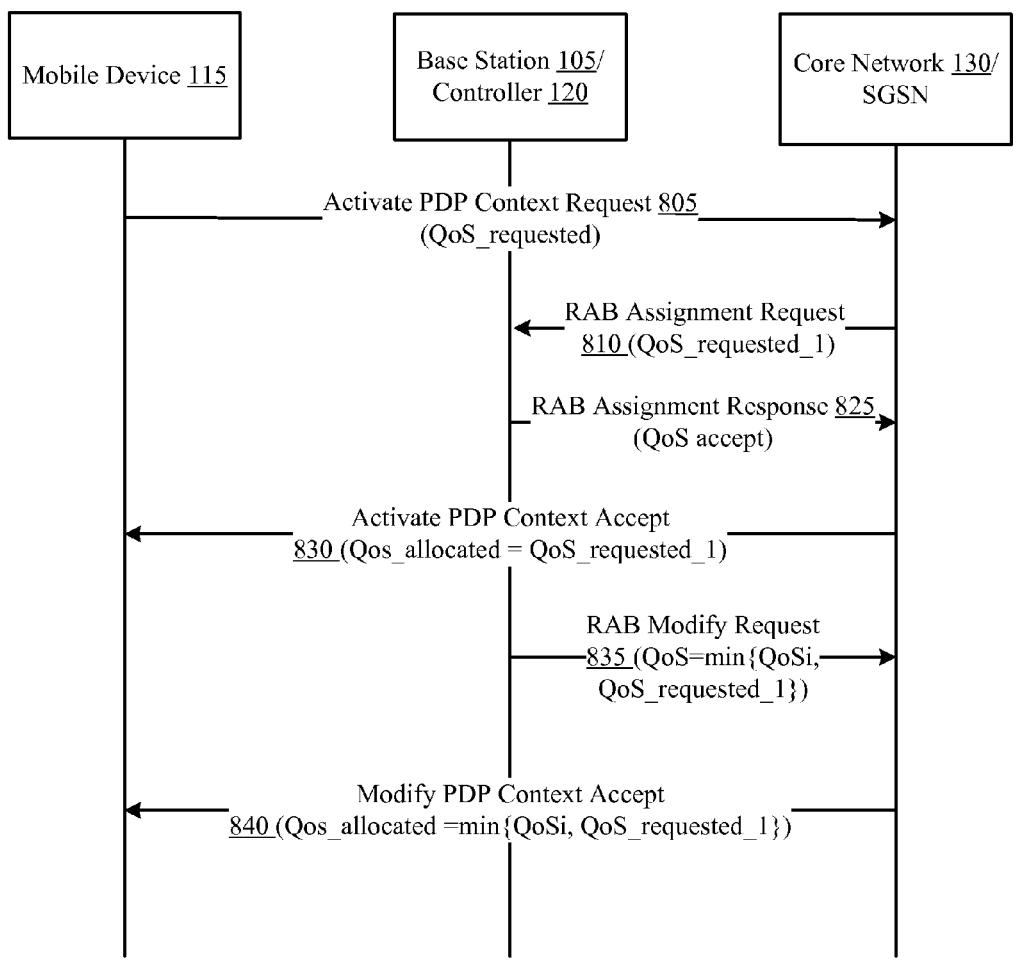
FIG. 8 shows a communications diagram involving a mobile device, a base station, and a core network in accordance with various embodiments.

Some embodiments may include a method where the base station 105 and/or controller 120 first accepts the requested QoS from core network 130/SGSN and immediately starts the RAB modification procedure. FIG. 8 shows an example of a communications diagram 800 how this may be implemented. Communications diagram 800 may be implemented through systems such as system 100 of FIG. 1 and/or system 600 of FIG. 6, for example. This procedure may offer the best available QoS to the mobile device 115 with less signaling. As shown in communications diagram 800, the mobile device 115 may transmit an Activate PDP Context Request (QoS_requested) 805 to the core network 130/SGSN. The core network 130/SGSN may determine a QoS_requested_1 based on QoS_sub and core network 130's resource availability, etc. The core network 130/SGSN may then transmit a RAB Assignment Request (QoS_requested_1) 810 to the base station 105/controller 120. The base station 105/controller 120 may accept with a RAB Assignment Response (or QoS accept) 825. The core network 130/SGSN may then transmit an Activate PDP Context Accept (or QoS_allocated=QoS_requested_1) 830 to the mobile device 115. The base station 105/controller 120 may transmit a RAB Modify Request (QoS=min{QoSi, QoS_requested_1}) 835 to the core network 130/SGSN as it may only support QoS=min{QoSi, QoS_requested_1}. The core network 130/SGSN may then transmit a Modify PDP Context Request (QoS_allocated=min{QoSi, QoS_requested_1}) 840 to the mobile device 115.

Figure 9:
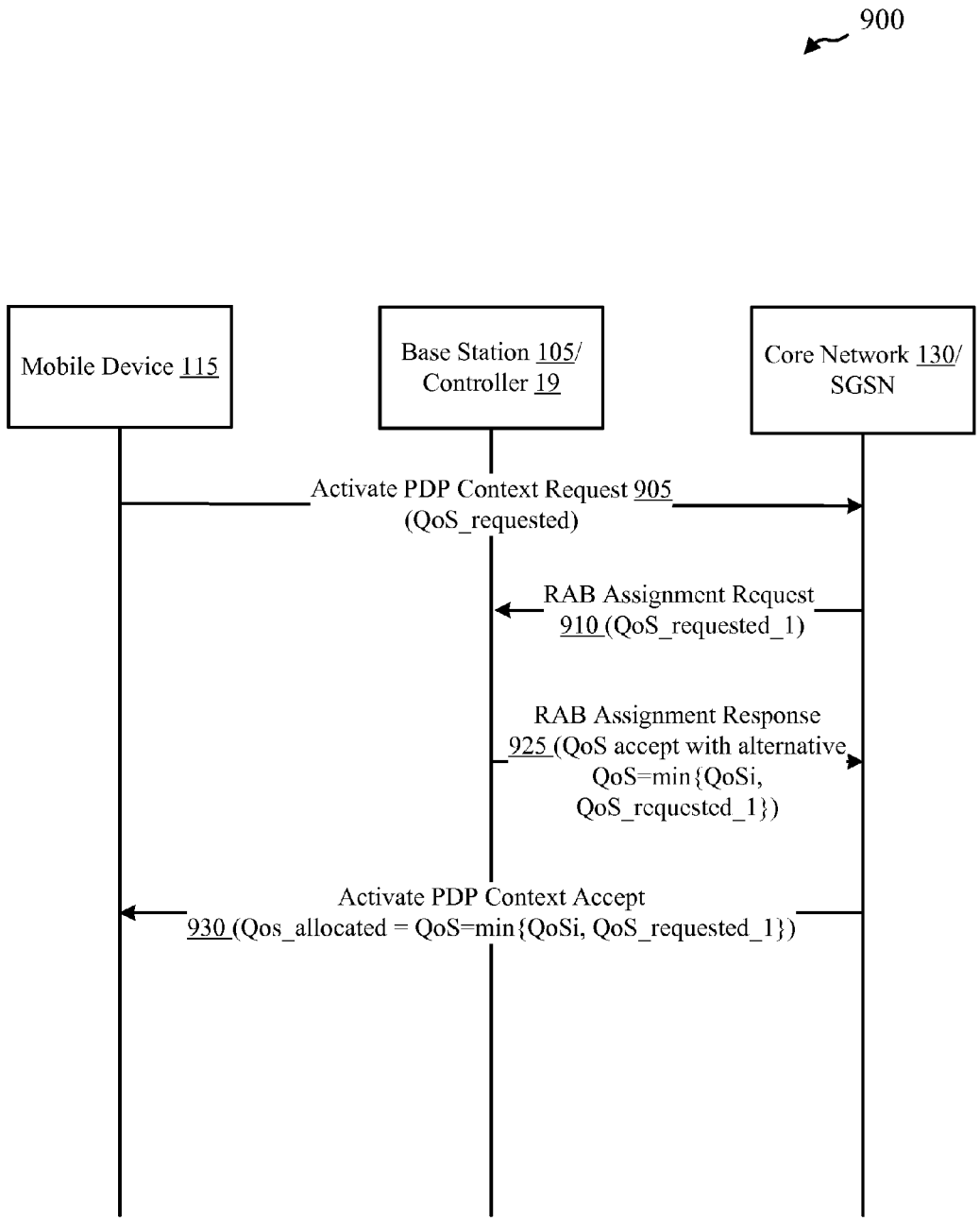
FIG. 9 shows a communications diagrams involving a mobile device, a base station, and a core network in accordance with various embodiments.

FIG. 9 shows a communications diagram 900 that may provide a streamlined method for handling QoS. Communications diagram 900 may be implemented through systems such as system 100 of FIG. 1 and/or system 600 of FIG. 6, for example. The base station 105/controller 120 may accept the requested QoS from core network 130/SGSN with the QoS modification request. This may offer the best available QoS to the mobile device 115 with even less signaling. As shown in communications diagram 900, the mobile device 115 may transmit an Activate PDP Context Request (QoS_requested) 905 to the core network 130/SGSN. The core network 130/SGSN may determine a QoS_requested_1 based on QoS_sub and core network 130's resource availability, etc. The core network 130/SGSN may then transmit a RAB Assignment Request (QoS_requested_1) 910 to the base station 105/controller 120. The base station 105/controller 120 may accept with a RAB Assignment Response (QoS accept with alternative QoS=min{QoSi, QoS_requested_1) 925 to accept not the QoS_requested_1 but to accept only alternative QoS. The core network 130/SGSN may then transmit an Activate PDP Context Accept (QoS_allocated=min{QoSi, QoS_requested_1) 930 to the mobile device 115.

The above examples of QoS scaling are for illustration purposes only and either of these methods can work with either EVDO, UMTS or other Radio AccessTechnologies.

Some embodiments may include slot cycle index scaling. Slot cycle index may provide information to a mobile device to determine when it may wake up from sleep to monitor for pages. In general, a mobile device may monitor for pages from a base station at intervals governed by slot cycle i. FIG. 10A shows a table 1000-$a$ for slot cycle index values and how period is calculated in number of slots based on the slot cycle index.

For example, a slot cycle of 9 corresponds to a period of 3072 slots (i.e., 5.12 s). In a fractional system, the same slot cycle may correspond to 3072 slots but span 5.12 Ds (i.e., 5.12*N s). As a result, the paging delay may increase N times on average. This may impact connection setup time for MT traffic. To invert this, a period corresponding to slot cycle may be inverse scaled by N so as to keep the paging delay the same. This may impact system performance as control channel load may increase due to increased frequency (i.e., reduced number of slots between subsequent paging instances) of overhead messages.

Some embodiments may be configured for slot cycle period scaling, which may divide the period by N. For fractional values of N, some embodiments may take [768/N] (i.e., integer portion of 768/N). FIG. 10B shows a table 1000-$b$ of how the scaled period may be determined. Scheduling of pages may become more difficult as offsets keep shifting with period scaling for some values of N.

Some embodiments may be configured for slot cycle index scaling where the index value may be shifted by an offset (e.g., effective index=index−(floor(N)−1)). Index scaling as such may involve no new parameters and no change in the mapping function. This may be analogous to the base station adjusting the scheduling based on N.

Some embodiments may include modifying the period calculation from slot cycle index. FIG. 10C shows a table 1000-$c$, which is one example of how these calculations may be done. This may have no explicit scaling by N, utilizing new parameters A and B instead.

Some embodiments may be configured for Data Rate Control (DRC) scaling. Due to time stretching, the effective data rate may be reduced by a factor of N assuming same transmit power density as in normal system. Mapping from DRC index to actual data rate may depend on N, adjusting for 1/N data rate. Lower layers may have only notion of relative time and rates in bits per Dilated sec in their world. The rates in bits per Dilated sec may remain the same across all fractions as the notion of Dilated sec depends on Dilation Factor (N).

In some embodiments, DRC values may not be scaled and have the rates as kbits per Dilated sec; this may help avoid having weird absolute values adjusted for N. Some embodiments may include PHY enhancements. With same transmit power as in a normal system or more than needed for same power transmit density, higher rates than (max normal system data rate/N) may be achieved (e.g., with less repetition, higher code rate).

Some embodiments may be configured for packet size scaling. For example, a 16-slot packet may take [(16−1)*4+1] slots for transmission due to interlaced transmission (with 4 interlaces) in a normal system (without early termination). It would take N times more in a fractional system. For N=4, it may take ~400 ms (up from ~100 ms). As a result, the end-to-end delay etc. could be impacted.

Depending on applications, 16- or 8-slot SUPs (Single User Packets) might have to be replaced with 4-slot packets for lower DRCs, for example. LoLat transmission mode corresponds to 4 or fewer slot packets. In some embodiments, for N>4, LoLat transmission mode may correspond to 2 or fewer slot packets Some embodiments may be configured for DSCLength scaling. A mobile device may use DSC (Data Source Channel) Channel to indicate to the base station the selected serving cell on the Forward link. The serving cell may be indicated by the 3-bit DSC value for that cell. A DSC value may take effect one slot after the end of its transmission and remains in effect for DSCLength slots, where DSCLength is specified by the FTCMAC Protocol. For high mobility applications, the performance may degrade in terms of data rate on the cell boundaries in case the time in sec is not kept the same.

Some embodiments may include DSCLength in slots that is inverse scaled by N to keep the time in sec same (or about same) so as not to degrade the user experience. The same thing may apply for Null DRC cover period where the time AT does not receive anything.

Some embodiments may utilize information such as the following related to timer classification and scaling. For example, some timers may not need explicit scaling, including, but not limited to, timers with timeout value in slots or CC Cycle. No explicit scaling may be needed as slot duration is scaled. These timers may include: at the Connection Layer: TOMPQCSupervision, TOMPSPSupervision; at the MAC Layer: TCCMPSupervision, TACMPAPSupervision, TACMPATProbeTimeout, TACMPCycleLen. Some timers may require explicit scaling, including, but not limited to, timers with timeout value in time such as the following: at the application layer: TRLPFlush, TRLPAbort; at the connection layer: TISPPilotAcq, TISPSyncAcq, TIDPATSetup; at the MAC layer: TFTCMDRCSupervision; at the security layer: DH Key Exchange timer. In these cases, values may need to be scaled from second/ms to dilated second/ms. However, for most timers, the value range in sec(?) may be sufficient to handle N. There may be exceptions, such as for session management (TSMPClose with default value of 54 hours) or connection layer (PilotDropTimer, PilotSupervisionTimer).

Figure 11:
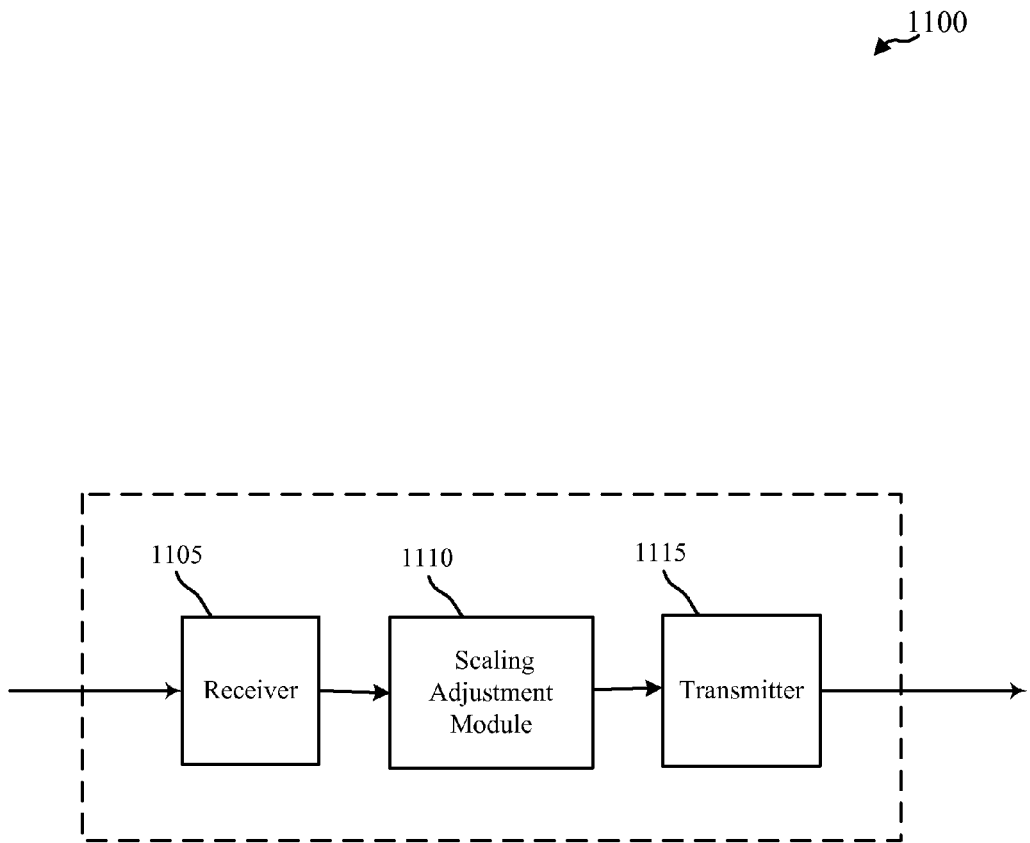
FIG. 11 shows a block diagram of a device that includes fractional bandwidth functionality including scaling adjustment in accordance with various embodiments.

Turning next to FIG. 11, a block diagram illustrates a device 1100 that includes fractional bandwidth functionality including scaling adjustment in accordance with various embodiments. The device 1100 may be an example of aspects of mobile device 115 of FIG. 1, FIG. 2A, FIG. 2B, FIG. 6, FIG. 7, FIG. 8, FIG. 9, FIG. 12, FIG. 13, and/or FIG. 14, systems clocks regime 300 of FIG. 3, and/or may be a device integrating with fractional bandwidth functionality (e.g., base stations 105 with reference to FIG. 1, FIG. 2A, FIG. 2B, FIG. 6, FIG. 7, FIG. 8, FIG. 9, FIG. 13, and/or FIG. 14). The device 1100 may also be a processor. The device 1100 may include a receiver module 1105, a scaling adjustment module 1110, and/or a transmitter module 1115. Each of these components may be in communication with each other.

These components of the device 1100 may, individually or collectively, be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1105 may receive information such as packet, data, and/or signaling information regarding what device 1100 has received or transmitted. The received information may be utilized by the time scaling module 1110 and/or fractional subsystem module 1115 for a variety of purposes.

Device 1100 and its modules 1105, 1110, and/or 1115 may be configured in some embodiments for scaling adjustment with respect to a fractional subsystem in a wireless communications system. The scaling adjustment module 1110 may identify a scaling factor for the fractional subsystem. The scaling adjustment module 1110 may identify a parameter and/or a timer associated with the fractional subsystem. The scaling adjustment module 1110 may determine an adjustment associated with the parameter and/or the timer based on the scaling factor. The scaling adjustment module 1110 may apply the adjustment with respect to the parameter and/or the timer for at least a portion of the fractional subsystem or another portion of the wireless communications system.

The scaling adjustment module 1110 may apply the adjustment with respect to the identified parameter and/or identified timer compensates for a time stretching of the identified parameter. Applying the adjustment may include inverse scaling of the identified parameter and/or timer.

The scaling adjustment module 1110 may scale at least the parameter or the timer associated with the fractional subsystem utilizing the scaling factor. At least the parameter or the timer may be relevant for an air interface of the fractional subsystem in some embodiments. The scaling adjustment module 1110 may further identify at least another parameter or another timer of the fractional subsystem and eschewing the adjustment with respect to at least the other parameter or the other timer.

In some embodiments, the parameter may include a QoS parameter. The QoS parameter may include at least a data rate or an end-to-end delay. The scaling adjustment module 1110 may apply the adjustment by adjusting the QoS parameter using the scaling factor associated with the fractional system to generate a scaled QoS parameter. The scaling module 1110 may negotiate a QoS configuration with a base station based on the scaled QoS parameter.

The transmitter module 1115 may be further configured to transmit a request based on the scaled QoS parameter. Some embodiments may further include transmitting a response based on the scaled QoS parameter. The scaled QoS parameter may be the smaller of a subscribed Qos and a currently available QoS in the fractional subsystem. In some embodiments, applying the adjustment through the scaling adjustment module 1110 may include adjusting back a scaled QoS configuration to determine an unscaled QoS configuration and determining whether a device is allowed the unscaled QoS configuration. At least one of the one or more QoS configuration profiles may be utilized to determine whether the device is allowed the unscaled QoS configuration.

In some embodiments, the parameter may include a slot cycle index, a slot cycle period, a Data Rate Control (DRC) index, a packet size, or a Data Source Channel (DSC) length. In some embodiments, applying the adjustment with the scaling adjustment module 1110 may include adjusting a slot cycle period using the scaling factor associated with the fractional system to generate a scaled slot cycle period. Applying the adjustment with the scaling adjustment module 1110 may include adjusting a slot cycle index using the scaling factor associated with the fractional system to generate a scaled slot cycle index. Applying the adjustment with the scaling adjustment module 1110 may include adjusting a data rate measurement unit associated with a Data Rate Control (DRC) Index using the scaling factor associated with the fractional system to generate a scaled data rate measurement unit. Applying the adjustment with the scaling adjustment module 1110 may include adjusting a number of slot packets based on the scaling factor associated with the fractional system to cap a transmission delay. Applying the adjustment with the scaling adjustment module 1110 may include adjusting a Data Source Channel (DSC) length using an inverse of the scaling factor associated with the fractional system to generate an inverse scaled DSC length. Some embodiments may request or utilize a higher data rate class or profile and/or lower delay class or profile. In some cases, a class may be varied instead of requesting a higher (or lower) class.

In some embodiments, the scaling adjustment module 1110 may apply the adjustment through a Radio Access Technology (RAT) application layer of the fractional subsystem. In some embodiments, the scaling adjustment module 1110 may apply the adjustment through a MAC layer.

In some embodiments, the transmitter module 1115 may be further configured to transmit the unscaled QoS parameter from a base station to determine whether the mobile device has a subscription rate that supports the unscaled QoS parameter.

Figure 12:
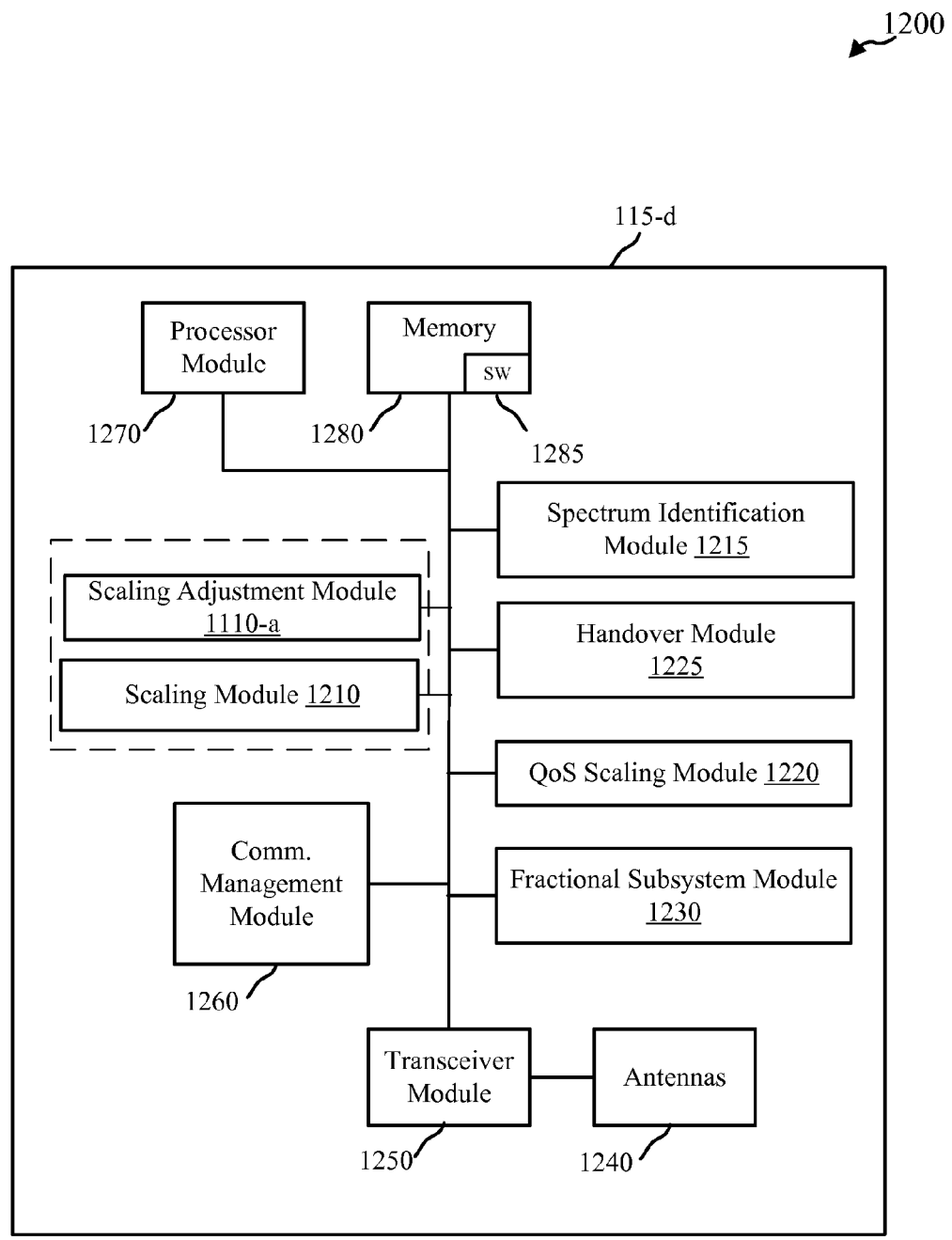
FIG. 12 is a block diagram of a mobile device configured to utilize fractional bandwidth in accordance with various embodiments.

FIG. 12 is a block diagram 1200 of a mobile device 115-d configured to utilize fractional bandwidth in accordance with various embodiments. The mobile device 115-d may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-d may have an internal power supply (not shown), such as a small battery, to facilitate mobile operation. In some embodiments, the mobile device 115-d may be the mobile device 115 of FIG. 1, FIG. 2A, FIG. 2B, FIG. 6, FIG. 7, FIG. 8, FIG. 9, FIG. 12, FIG. 13, and/or FIG. 14 and/or the device 1100 of FIG. 11. The mobile device 115-d may be a multi-mode mobile device. The mobile device 115-d may be referred to as a wireless communications device in some cases.

The mobile device 115-d may include antennas 1240, a transceiver module 1250, memory 1280, and a processor module 1270, which each may be in communication, directly or indirectly, with each other (e.g., via one or more buses). The transceiver module 1250 is configured to communicate bi-directionally, via the antennas 1240 and/or one or more wired or wireless links, with one or more networks, as described above. For example, the transceiver module 1250 may be configured to communicate bi-directionally with base stations 105 of FIG. 1, FIG. 2A, FIG. 2B, FIG. 6, FIG. 7, FIG. 8, FIG. 9, FIG. 13, and/or FIG. 14. The transceiver module 1250 may include a modem configured to modulate the packets and provide the modulated packets to the antennas 1240 for transmission, and to demodulate packets received from the antennas 1240. While the mobile device 115-d may include a single antenna, the mobile device 115-d will typically include multiple antennas 1240 for multiple links.

The memory 1280 may include random access memory (RAM) and read-only memory (ROM). The memory 1280 may store computer-readable, computer-executable software code 1285 containing instructions that are configured to, when executed, cause the processor module 1270 to perform various functions described herein (e.g., call processing, database management, message routing, etc.). Alternatively, the software 1285 may not be directly executable by the processor module 1270 but be configured to cause the computer (e.g., when compiled and executed) to perform functions described herein.

The processor module 1270 may include an intelligent hardware device, e.g., a central processing unit (CPU) such as those made by Intel® Corporation or AMD®, a microcontroller, an application-specific integrated circuit (ASIC), etc. The processor module 1270 may include a speech encoder (not shown) configured to receive audio via a microphone, convert the audio into packets (e.g., 30 ms in length) representative of the received audio, provide the audio packets to the transceiver module 1250, and provide indications of whether a user is speaking. Alternatively, an encoder may only provide packets to the transceiver module 1250, with the provision or withholding/suppression of the packet itself providing the indication of whether a user is speaking.

According to the architecture of FIG. 12, the mobile device 115-d may further include a communications management module 1260. The communications management module 1260 may manage communications with other mobile devices 115. By way of example, the communications management module 1260 may be a component of the mobile device 115-d in communication with some or all of the other components of the mobile device 115-d via a bus. Alternatively, functionality of the communications management module 1260 may be implemented as a component of the transceiver module 1250, as a computer program product, and/or as one or more controller elements of the processor module 1270.

The components for mobile device 115-d may be configured to implement aspects discussed above with respect to device 1100 in FIG. 11 and may not be repeated here for the sake of brevity. The scaling adjustment module 1110-a may be the scaling adjustment module 1110 of FIG. 11, for example.

The mobile device 115-*d* may also include a spectrum identification module 1215. The spectrum identification module 1215 may be utilized to identify spectrum available for fractional waveforms. In some embodiments, a handover module 1225 may be utilized to perform handover procedures of the mobile device 115-*d* from one base station to another. For example, the handover module 1225 may perform a handover procedure of the mobile device 115-*d* from one base station to another where normal waveforms are utilized between the mobile device 115-*d* and one of the base stations and fractional waveforms are utilized between the mobile device and another base station. A QoS scaling module 1220 may be utilized to scale and/or invert parameters related to quality of service; in some embodiments, QoS scaling module may be part of scaling adjustment module 1110-*a*. Mobile device 115-*d* may include a scaling module 1210 that may be utilized to implement fractional bandwidth through the use of scaling factors and/or chip rate adjustments. A fractional subsystem module 1230 may also be included to help manage the use of fractional bandwidth.

In some embodiments, the transceiver module 1250, in conjunction with antennas 1240, along with other possible components of mobile device 115-*d*, may transmit information regarding fractional waveforms, scaling factors, and/or scaling adjustment information from the mobile device 115-*d* to base stations or a core network. In some embodiments, the transceiver module 1250 in conjunction with antennas 1240, along with other possible components of mobile device 115-*d*, may transmit information, such as fractional waveforms, scaling factors, and/or scaling adjustment information to base stations or a core network such that these devices or systems may utilize fractional waveforms.

Figure 13:
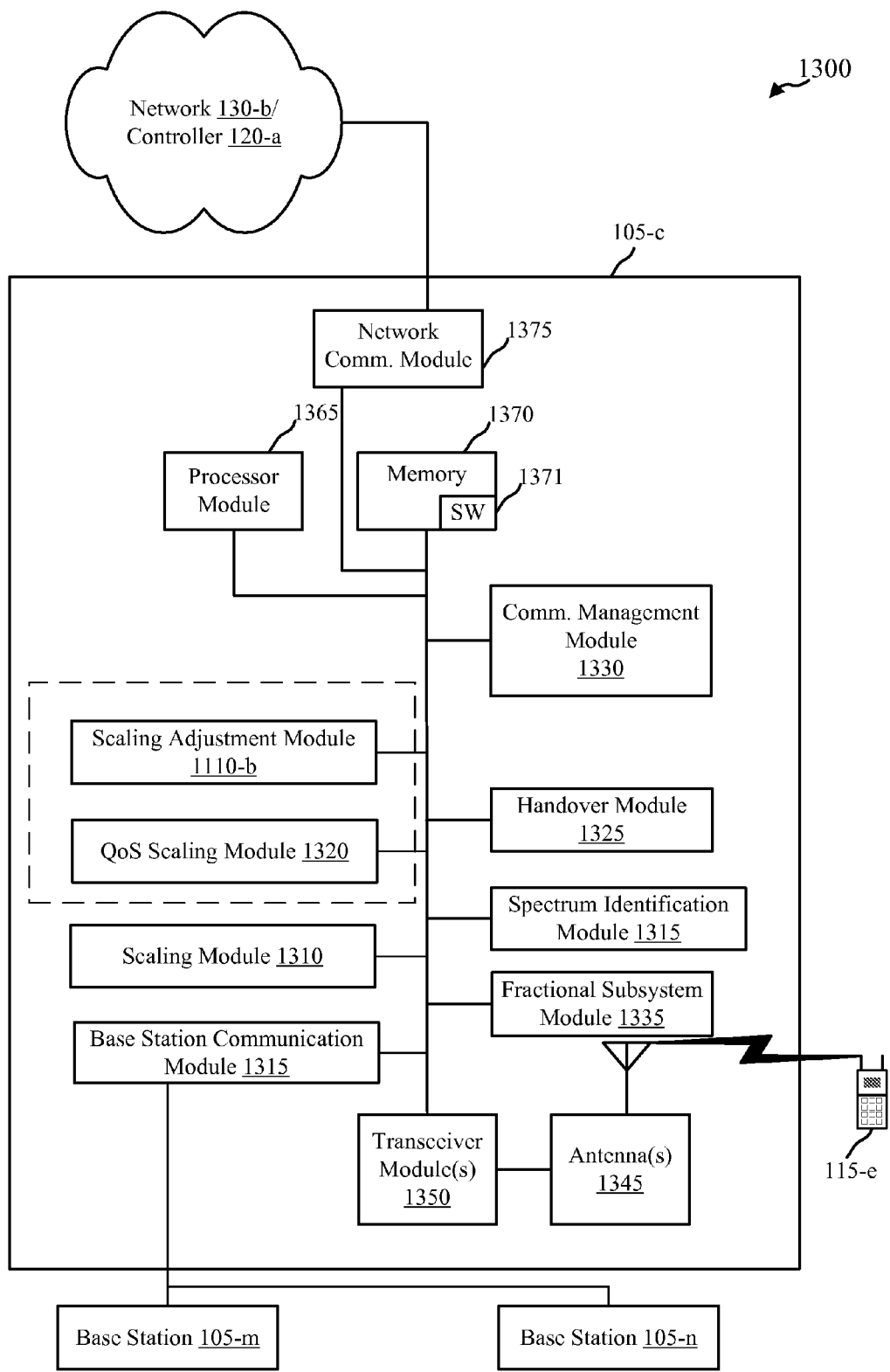
FIG. 13 shows a block diagram of a communications system that may be configured for utilizing fractional waveforms in accordance with various embodiments.

FIG. 13 shows a block diagram of a communications system 1300 that may be configured for utilizing fractional bandwidth in accordance with various embodiments. This system 1300 may be an example of aspects of the system 100 depicted in FIG. 1, system 200-*a* of FIG. 2A, system 200-*b* of FIG. 2B, system 600 of FIG. 6, system 700 of FIG. 7, system 800 of FIG. 8, system 900 of FIG. 9, and/or system 1400 of FIG. 14. The base station 105-*c* may include antennas 1345, a transceiver module 1350, memory 1370, and a processor module 1365, which each may be in communication, directly or indirectly, with each other (e.g., over one or more buses). The transceiver module 1350 may be configured to communicate bi-directionally, via the antennas 1345, with the mobile device 115-*e*, which may be a multi-mode mobile device. The transceiver module 1350 (and/or other components of the base station 105-*c*) may also be configured to communicate bi-directionally with one or more networks. In some cases, the base station 105-*c* may communicate with the network 130-*b* and/or controller 120-*a* through network communications module 1375. Base station 105-*c* may be an example of an eNodeB base station, a Home eNodeB base station, a NodeB base station, and/or a Home NodeB base station. Controller 120-*a* may be integrated into base station 105-*c* in some cases, such as with an eNodeB base station.

Base station 105-*c* may also communicate with other base stations 105, such as base station 105-*m* and base station 105-*n*. Each of the base stations 105 may communicate with mobile device 115-*e* using different wireless communications technologies, such as different Radio Access Technologies. In some cases, base station 105-*c* may communicate with other base stations such as 105-*m* and/or 105-*n* utilizing base station communication module 1315. In some embodiments, base station communication module 1315 may provide an X2 interface within an LTE wireless communication technology to provide communication between some of the base stations 105. In some embodiments, base station 105-*b* may communicate with other base stations through controller 120-*a* and/or network 130-*b*.

The memory 1370 may include random access memory (RAM) and read-only memory (ROM). The memory 1370 may also store computer-readable, computer-executable software code 1371 containing instructions that are configured to, when executed, cause the processor module 1365 to perform various functions described herein (e.g., call processing, database management, message routing, etc.). Alternatively, the software 1371 may not be directly executable by the processor module 1365 but be configured to cause the computer, e.g., when compiled and executed, to perform functions described herein.

The processor module 1365 may include an intelligent hardware device, e.g., a central processing unit (CPU) such as those made by Intel® Corporation or AMD®, a microcontroller, an application-specific integrated circuit (ASIC), etc. The processor module 1365 may include a speech encoder (not shown) configured to receive audio via a microphone, convert the audio into packets (e.g., 30 ms in length) representative of the received audio, provide the audio packets to the transceiver module 1350, and provide indications of whether a user is speaking. Alternatively, an encoder may only provide packets to the transceiver module 1350, with the provision or withholding/suppression of the packet itself providing the indication of whether a user is speaking.

The transceiver module 1350 may include a modem configured to modulate the packets and provide the modulated packets to the antennas 1345 for transmission, and to demodulate packets received from the antennas 1345. While some examples of the base station 105-*c* may include a single antenna 1345, the base station 105-*c* preferably includes multiple antennas 1345 for multiple links which may support carrier aggregation. For example, one or more links may be used to support macro communications with mobile device 115-*e*.

According to the architecture of FIG. 13, the base station 105-*c* may further include a communications management module 1330. The communications management module 1330 may manage communications with other base stations 105. By way of example, the communications management module 1330 may be a component of the base station 105-*c* in communication with some or all of the other components of the base station 105-*c* via a bus. Alternatively, functionality of the communications management module 1330 may be implemented as a component of the transceiver module 1350, as a computer program product, and/or as one or more controller elements of the processor module 1365.

The components for base station 105-*c* may be configured to implement aspects discussed above with respect to device 1100 in FIG. 11 and may not be repeated here for the sake of brevity. For example, the scaling adjustment module 1110-*b* may be the scaling adjustment module 1110 of FIG. 11.

The base station 105-*c* may also include a spectrum identification module 1315. The spectrum identification module 1315 may be utilized to identify spectrum available for fractional waveforms. In some embodiments, a handover module 1325 may be utilized to perform handover procedures of the mobile device 115-*e* from one base station to another. For example, the handover module 1325 may perform a handover procedure of the mobile device 115-*e* from one base station to another where normal waveforms are utilized between the mobile device 115-*e* and one of the base stations and fractional waveforms are utilized between the mobile device and another base station. A QoS scaling module 1320 may be utilized to scale and/or invert parameters related to quality of service; in some embodiments, QoS scaling module 1320 may be part of scaling adjustment module 1110-*b*. The base station 105-*c* may include a scaling module 1310 that may be utilized to implement fractional bandwidth through the use of scaling factors and/or chip rate adjustments. A fractional subsystem module 1335 may also be included to help manage the use of fractional bandwidth.

In some embodiments, the transceiver module 1350 in conjunction with antennas 1345 along with other possible components of base station 105-*c* may transmit information regarding fractional waveforms and/or scaling factors from the base station 105-*c* to the mobile device 115-*e*, to other base stations 105-*m*/105-*n*, or core network 130-*b*. In some embodiments, the transceiver module 1350 in conjunction with antennas 1345 along with other possible components of base station 105-*c* may transmit information to the mobile device 115-*e*, to other base stations 105-*m*/105-*n*, or core network 130-*b*, such as fractional waveforms and/or scaling factors, such that these devices or systems may utilize fractional waveforms.

Figure 14:
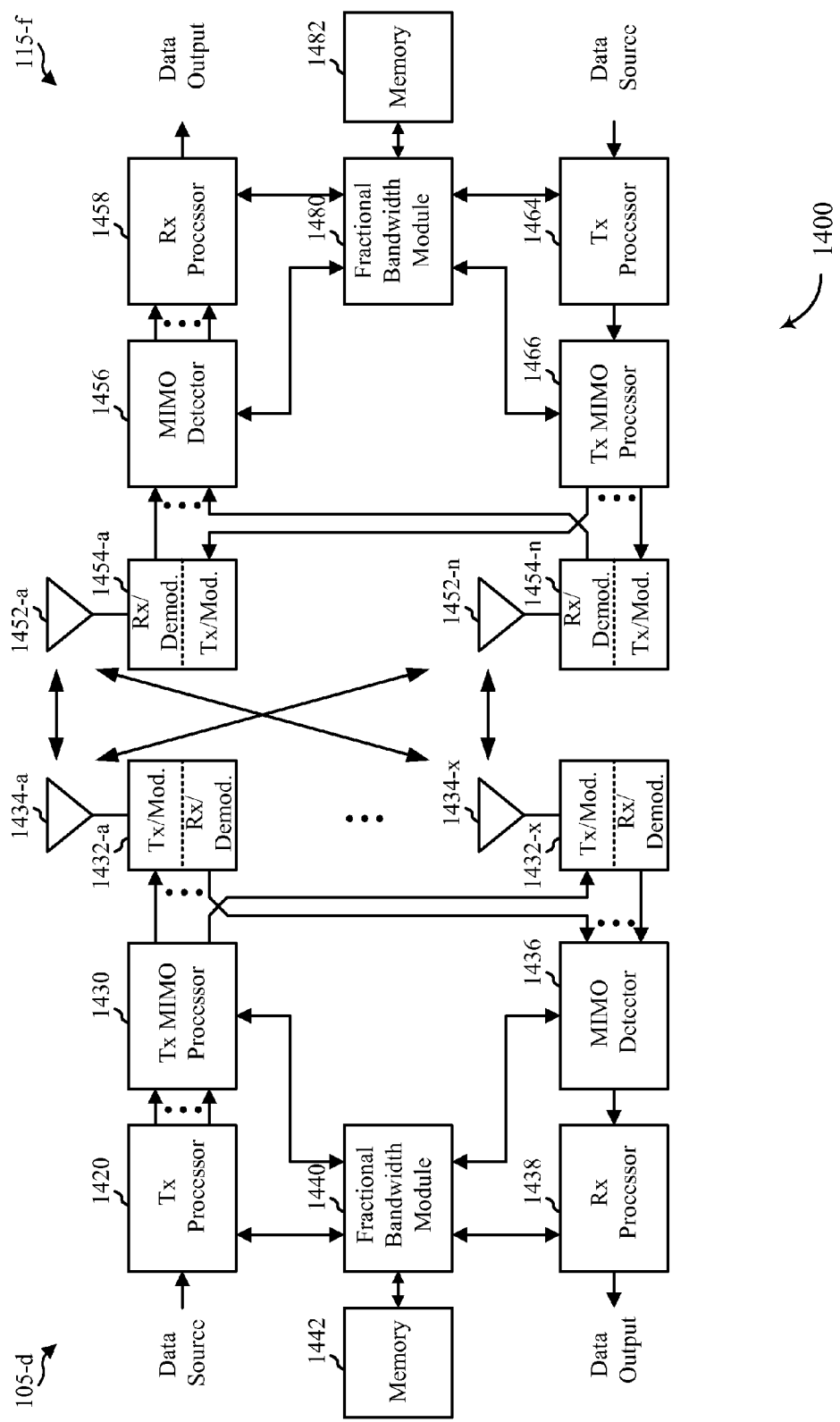
FIG. 14 shows a block diagram of a wireless communications system that includes a base station and a mobile device in accordance with various embodiments.

FIG. 14 is a block diagram of a system 1400 including a base station 105-*d* and a mobile device 115-*f* in accordance with various embodiments. This system 1400 may be an example of the system 100 depicted in FIG. 1, system 200-*a* of FIG. 2A, system 200-*b* of FIG. 2B, system 600 of FIG. 6, system 700 of FIG. 7, system 800 of FIG. 8, system 900 of FIG. 9, and/or system 1300 of FIG. 13. The base station 105-*d* may be equipped with antennas 1434-*a* through 1434-*x*, and the mobile device 115-*f* may be equipped with antennas 1452-*a* through 1452-*n*. At the base station 105-*d*, a transmitter processor 1420 may receive data from a data source.

The transmitter processor 1420 may process the data. The transmitter processor 1420 may also generate reference symbols, and a cell-specific reference signal. A transmit (TX) MIMO processor 1430 may perform spatial processing (e.g., precoding) on data symbols, control symbols, and/or reference symbols, if applicable, and may provide output symbol streams to the transmit modulators 1432-*a* through 1432-*x*. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink (DL) signal. In one example, DL signals from modulators 1432-*a* through 1432-*x* may be transmitted via the antennas 1434-*a* through 1434-*x*, respectively. The transmitter processor 1420 may receive information from a fractional bandwidth module 1440. The fractional bandwidth module 1440 may be configured to identify a scaling factor for a fractional subsystem of system 1400. The fractional bandwidth module 1440 may be configured to identify a parameter and/or a timer associated with the fractional subsystem of system 1400. The fractional bandwidth module 1440 may determine an adjustment associated with the parameter and/or timer based on the scaling factor. The fractional bandwidth module 1440 may apply the adjustment with respect to the parameter and/or timer for at least a portion of the fractional subsystem or another portion of the wireless communications system. In some embodiments, the fractional bandwidth module 1440 may be implemented as part of a general processor, the transmitter processor 1420, and/or the receive processor 1438.

At the mobile device 115-*f*, the mobile device antennas 1452-*a* through 1452-*n* may receive the DL signals from the base station 105-*d* and may provide the received signals to the demodulators 1454-*a* through 1454-*n*, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all the demodulators 1454-*a* through 1454-*n*, perform MIMO detection on the received symbols if applicable, and provide detected symbols. A receiver processor 1458 may process (e.g., demodulate, deinterleave, and decode) the detected symbols, providing decoded data for the mobile device 115-*f* to a data output, and provide decoded control information to a processor 1480, or memory 1482.

On the uplink (UL), at the mobile device 115-*f*, a transmitter processor 1464 may receive and process data from a data source. The transmitter processor 1464 may also generate reference symbols for a reference signal. The symbols from the transmitter processor 1464 may be precoded by a transmit MIMO processor 1466 if applicable, further processed by the demodulators 1454-*a* through 1454-*n* (e.g., for SC-FDMA, etc), and be transmitted to the base station 105-*d* in accordance with the transmission parameters received from the base station 105-*d*. The transmitter processor 1464 may be configured to utilize scaling factors to relate one or more aspects of one subsystem with one or more aspects of another subsystem within system 1400. The transmitter processor 1464 may also be configured to generate fractional waveforms through utilizing a scaling factor. The transmitter processor 1464 may receive information from fractional bandwidth module 1480. The fractional bandwidth module 1480 may be configured to identify a scaling factor for a fractional subsystem of system 1400. The fractional bandwidth module 1480 may be configured to identify a parameter and/or a timer associated with the fractional subsystem of system 1400. The fractional bandwidth module 1480 may determine an adjustment associated with the parameter and/or timer based on the scaling factor. The fractional bandwidth module 1480 may apply the adjustment with respect to the parameter and/or timer for at least a portion of the fractional subsystem or another portion of the wireless communications system. At the base station 105-*d*, the UL signals from the mobile device 115-*f* may be received by the antennas 1434, processed by the demodulators 1432, detected by a MIMO detector 1436 if applicable, and further processed by a receive processor. The receive processor 1438 may provide decoded data to a data output and to the fractional bandwidth module 1480. In some embodiments, the fractional bandwidth module 1480 may be implemented as part of a general processor, the transmitter processor 1464, and/or the receive processor 1458.

Figure 15:
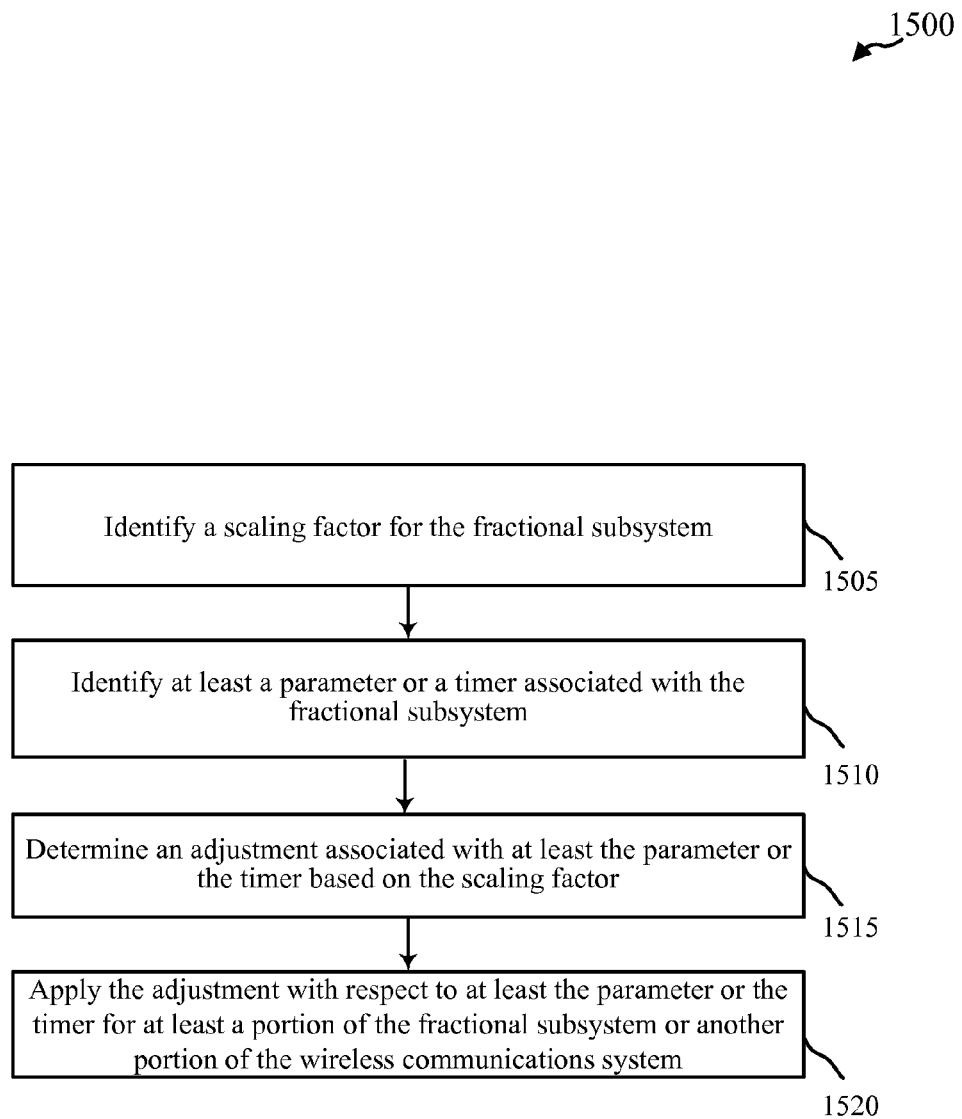
FIG. 15 shows a flow diagram of a method for scaling parameters with respect to a fractional subsystem in a wireless communications system in accordance with various embodiments.

Turning to FIG. 15, a flow diagram of a method 1500 for scaling adjustment with respect to a fractional subsystem in a wireless communications system is provided in accordance with various embodiments. Method 1500 may be implemented utilizing various wireless communications devices including, but not limited to: a mobile device 115 as seen FIG. 1, FIG. 2A, FIG. 2B, FIG. 6, FIG. 7, FIG. 8, FIG. 9, FIG. 12, FIG. 13, and/or FIG. 14; a base station 105 as seen in FIG. 1, FIG. 2A, FIG. 2B, FIG. 6, FIG. 7, FIG. 8, FIG. 9, FIG. 13, and/or FIG. 14; a core network 130 or controller 120 as seen in FIG. 1, FIG. 6, FIG. 7, FIG. 8, FIG. 9, and/or FIG. 13; and/or a device 1100 of FIG. 11.

At block 1505, a scaling factor for the fractional subsystem may be identified. At least a parameter or a timer associated with the fractional subsystem may be identified at block 1510. An adjustment associated with at least the parameter or the timer based on the scaling factor may be determined at 1515. The adjustment may be applied with respect to at least the parameter or the timer for at least a portion of the fractional subsystem or another portion of the wireless communications system at block 1520.

Applying the adjustment with respect to at least the identified parameter or the timer may compensate for a time stretching of the identified parameter. Applying the adjustment may include inverse scaling at least the identified parameter or the timer.

Some embodiments of method 1500 may further include scaling at least the parameter or the timer associated with the fractional subsystem utilizing the scaling factor. At least the parameter or the timer is relevant for an air interface of the fractional subsystem in some embodiments. Some embodiments may further include identifying at least another parameter or another timer of the fractional subsystem and eschewing the adjustment with respect to at least the other parameter or the other timer.

In some embodiments, the parameter includes a QoS parameter. The QoS parameter may include at least a data rate or an end-to-end delay. Applying the adjustment may include adjusting the QoS parameter using the scaling factor associated with the fractional system to generate a scaled QoS parameter. Some embodiments may further include negotiating a QoS configuration with a base station based on the scaled QoS parameter.

Some embodiments may further include transmitting a request based on the scaled QoS parameter. Some embodiments may further include transmitting a response based on the scaled QoS parameter. The scaled QoS parameter may be the smaller of a subscribed QoS and a currently available QoS in the fractional subsystem.

Applying the adjustment may occur at a Radio Access Technology (RAT) application layer of the fractional subsystem. Applying the adjustment may occur at a MAC layer.

Some embodiments may further include transmitting the unscaled QoS parameter from a base station to determine whether the mobile device has a subscription rate that supports the unscaled QoS parameter.

In some embodiments applying the adjustment may include adjusting back a scaled QoS configuration to determine an unscaled QoS configuration and determining whether a device is allowed the unscaled QoS configuration. At least one of the one or more QoS configuration profiles may be utilized to determine whether the device is allowed the unscaled QoS configuration.

In some embodiments, the parameter may include at least a slot cycle index, a slot cycle period, a Data Rate Control (DRC) index, a packet size, or a Data Source Channel (DSC) length. In some embodiments, applying the adjustment comprises adjusting a slot cycle period using the scaling factor associated with the fractional system to generate a scaled slot cycle period. Applying the adjustment may include adjusting a slot cycle index using the scaling factor associated with the fractional system to generate a scaled slot cycle index. Applying the adjustment may include adjusting a data rate measurement unit associated with a DRC index using the scaling factor associated with the fractional system to generate a scaled data rate measurement unit. Applying the adjustment may include adjusting a number of slot packets based on the scaling factor associated with the fractional system to cap a transmission delay. Applying the adjustment comprises adjusting a Data Source Channel (DSC) length using an inverse of the scaling factor associated with the fractional system to generate an inverse scaled DSC length.

Method 1500 may be performed by a mobile device in some embodiments. Method 1500 may be performed by at least a base station or a core network in some embodiments.

Figure 16:
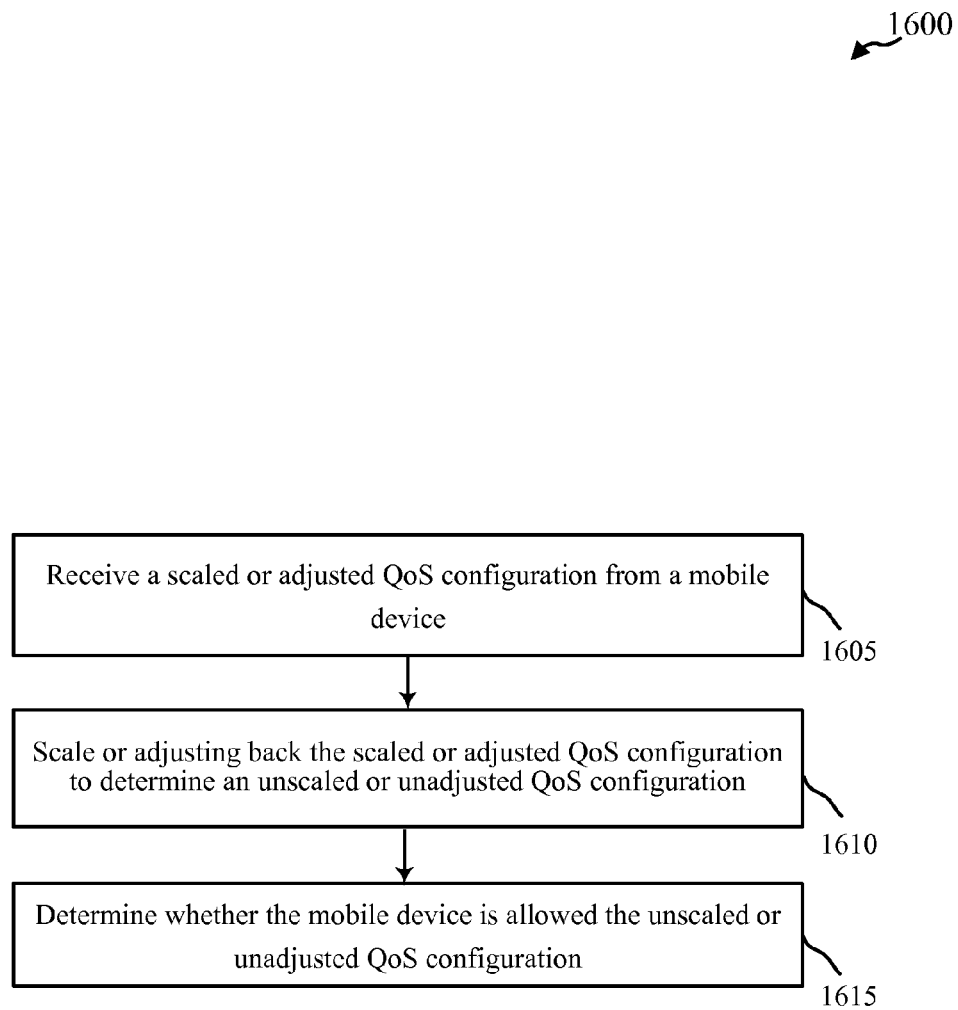
FIG. 16 shows a flow diagram of a method for implementing QoS with respect to a fractional subsystem in accordance with various embodiments.

Turning to FIG. 16, a flow diagram of a method 1600 for implementing quality of service (QoS) with respect to a fractional subsystem in a wireless communications system is provided in accordance with various embodiments. Method 1600 may be implemented utilizing various wireless communications devices including, but not limited to: a mobile device 115 as seen FIG. 1, FIG. 2A, FIG. 2B, FIG. 6, FIG. 7, FIG. 8, FIG. 9, FIG. 12, FIG. 13, and/or FIG. 14; a base station 105 as seen in FIG. 1, FIG. 2A, FIG. 2B, FIG. 6, FIG. 7, FIG. 8, FIG. 9, FIG. 13, and/or FIG. 14; a core network 130 or controller 120 as seen in FIG. 1, FIG. 6, FIG. 7, FIG. 8, FIG. 9, and/or FIG. 13; and/or a device 1100 of FIG. 11. Method 1600 may include and/or represent aspects of method 1500 of FIG. 15.

At block 1605, a scaled or adjusted QoS configuration may be received from a mobile device. At block 1610, the scaled or adjusted QoS configuration may be scaled or adjusted back to determine an unscaled or unadjusted QoS configuration. At block 1615, it may be determined whether the mobile device is allowed the unscaled or unadjusted QoS configuration.

In some embodiments, one or more QoS configuration profiles may be generated. Each QoS configuration profile may relate a scaled or adjusted QoS parameter to an unscaled or unadjusted QoS parameter. At least one of the one or more QoS configuration profiles may be utilized to determine whether the mobile device is allowed the unscaled QoS configuration. Method 1600 may be implemented at a base station in some embodiments.

Figure 17:
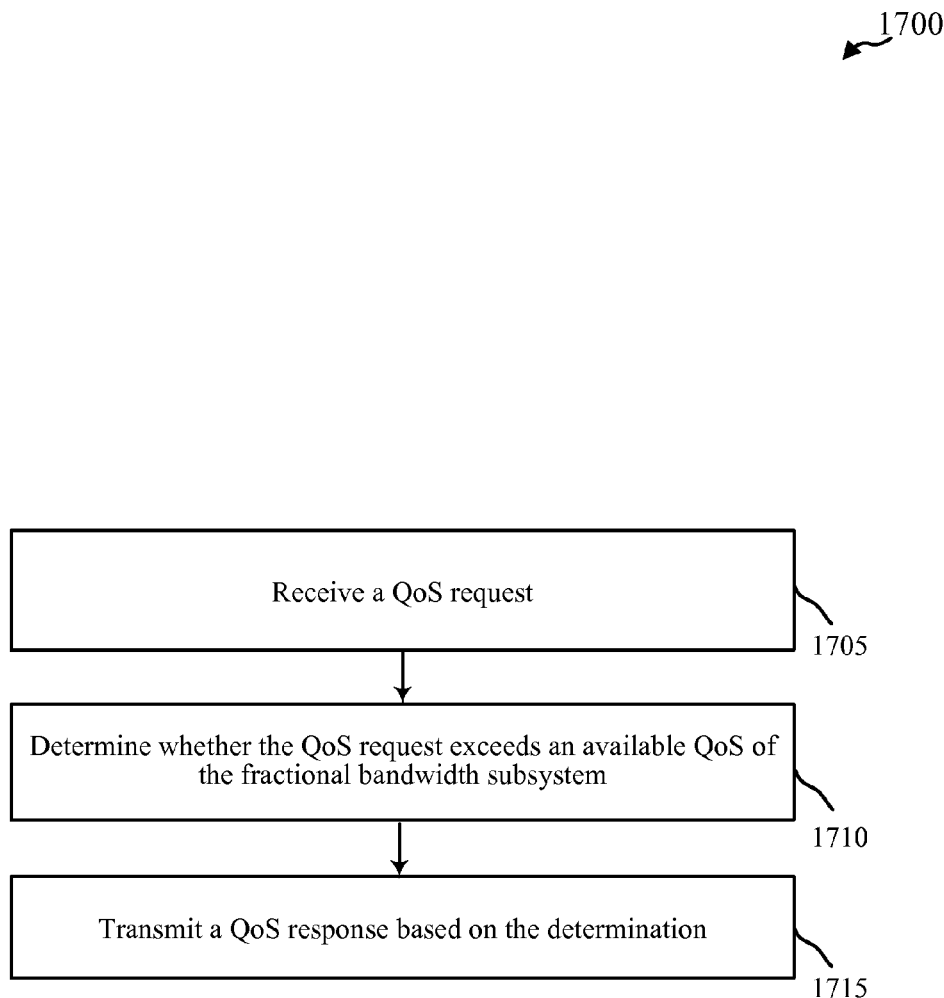
FIG. 17 shows a flow diagram of a method for implementing QoS with respect to a fractional subsystem in accordance with various embodiments.

Turning to FIG. 17, a flow diagram of a method 1700 for implementing quality of service (QoS) with respect to a fractional subsystem in a wireless communications system is provided in accordance with various embodiments. Method 1700 may be implemented utilizing various wireless communications devices including, but not limited to: a mobile device 115 as seen FIG. 1, FIG. 2A, FIG. 2B, FIG. 6, FIG. 7, FIG. 8, FIG. 9, FIG. 12, FIG. 13, and/or FIG. 14; a base station 105 as seen in FIG. 1, FIG. 2A, FIG. 2B, FIG. 6, FIG. 7, FIG. 8, FIG. 9, FIG. 13, and/or FIG. 14; a core network 130 or controller 120 as seen in FIG. 1, FIG. 6, FIG. 7, FIG. 8, FIG. 9, and/or FIG. 13; and/or a device 1100 of FIG. 11. Method 1700 may include and/or represent aspects of method 1500 of FIG. 15.

At block 1705, a QoS request may be received. In some embodiments, the QoS may be received from a core network; the QoS request may be received at a base station. At block 1710, it may be determining whether the QoS request exceeds an available QoS of the fractional bandwidth subsystem. At block 1715, a QoS response may be transmitted based on the determination. The QoS response may be transmitted to a core network from a base station in some embodiments. With method 1600, transmitting the QoS response may include may include transmitting at least the available QoS or the requested QoS.

The detailed description set forth above in connection with the appended drawings describes exemplary embodiments and does not represent the only embodiments that may be implemented or that are within the scope of the claims. The term "exemplary" used throughout this description means "serving as an example, instance, or illustration,"

and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for scaling adjustment with respect to a fractional subsystem in a wireless communications system, the method comprising:

identifying a scaling factor for the fractional subsystem, wherein the scaling factor is based on a ratio between a carrier bandwidth for a normal bandwidth system and a carrier bandwidth for the fractional subsystem, and wherein applying the scaling factor to the fractional subsystem results in at least a data rate of the fractional subsystem being changed from a data rate of the normal bandwidth system;

identifying at least a parameter or a timer associated with the fractional subsystem;

determining an adjustment associated with at least the parameter or the timer based on the scaling factor;

applying the adjustment with respect to at least the parameter or the timer for at least a portion of the fractional subsystem or another portion of the wireless communications system and transmitting data over the carrier bandwidth for the fractional subsystem based at least in part on the adjustment.

2. The method of claim 1, wherein applying the adjustment with respect to at least the identified parameter or the identified timer compensates for a time stretching of the identified parameter.

3. The method of claim 1, wherein applying the adjustment comprises inverse scaling at least the identified parameter or the timer.

4. The method of claim 1, further comprising:
scaling at least the parameter or the timer associated with the fractional subsystem utilizing the scaling factor.

5. The method of claim 1, wherein at least the parameter or the timer is relevant for an air interface of the fractional subsystem.

6. The method of claim 1, further comprising:
identifying at least an other parameter or an other timer of the fractional subsystem; and
eschewing the adjustment with respect to at least the other parameter or the other timer.

7. The method of claim 1, wherein the parameter comprises a QoS parameter.

8. The method of claim 7, wherein the QoS parameter comprises at least a data rate or an end-to-end delay.

9. The method of claim 7, wherein applying the adjustment comprises adjusting the QoS parameter using the scaling factor associated with the fractional subsystem to generate a scaled QoS parameter.

10. The method of claim 9, further comprising:
negotiating a QoS configuration with a base station based on the scaled QoS parameter.

11. The method of claim 9, further comprising:
transmitting a request based on the scaled QoS parameter.

12. The method of claim 9, further comprising:
transmitting a response based on the scaled QoS parameter.

13. The method of claim 11, wherein the scaled QoS parameter is the smaller of a subscribed QoS and a currently available QoS in the fractional subsystem.

14. The method of claim 1, wherein applying the adjustment occurs at a Radio Access Technology (RAT) application layer of the fractional subsystem.

15. The method of claim 1, wherein applying the adjustment occurs at a MAC layer.

16. The method of claim 11, further comprising:
transmitting an unscaled QoS parameter from a base station to determine whether a device has a subscription rate that supports the unscaled QoS parameter.

17. The method of claim 1, wherein applying the adjustment further comprises:
adjusting back a scaled QoS configuration to determine an unscaled QoS configuration; and
determining whether a device is allowed the unscaled QoS configuration.

18. The method of claim 17, further comprising:
utilizing one or more QoS configuration profiles to determine whether the device is allowed the unscaled QoS configuration.

19. The method of claim 1, wherein the parameter comprises at least a slot cycle index, a slot cycle period, a Data Rate Control (DRC) index, a packet size, or a Data Source Channel (DSC) length.

20. The method of claim 1, wherein applying the adjustment comprises adjusting a slot cycle period using the scaling factor associated with the fractional subsystem to generate a scaled slot cycle period.

21. The method of claim 1, wherein applying the adjustment comprises adjusting a slot cycle index using the scaling factor associated with the fractional subsystem to generate a scaled slot cycle index.

22. The method of claim 1, wherein applying the adjustment comprises adjusting a data rate measurement unit associated with a Data Rate Control Index (DRX) using the scaling factor associated with the fractional subsystem to generate a scaled data rate measurement unit.

23. The method of claim 1, wherein applying the adjustment comprises adjusting a number of slot packets based on the scaling factor associated with the fractional subsystem to cap a transmission delay.

24. The method of claim 1, wherein applying the adjustment comprises adjusting a Data Source Channel (DSC) length using an inverse of the scaling factor associated with the fractional subsystem to generate an inverse scaled DSC length.

25. The method of claim 1, wherein the steps are performed by a mobile device.

26. The method of claim 1, wherein the steps are performed by at least a base station or a core network.

27. A wireless communications system configured for scaling adjustments with respect to a fractional subsystem in the wireless communications system, the wireless communications system comprising:
a means for identifying a scaling factor for the fractional subsystem, wherein the scaling factor is based on a ratio between a carrier bandwidth for a normal bandwidth system and a carrier bandwidth for the fractional subsystem, and wherein applying the scaling factor to the fractional subsystem results in at least a data rate of the fractional subsystem being changed from a data rate of the normal bandwidth system;
a means for identifying at least a parameter or a timer associated with the fractional subsystem;
a means for determining an adjustment associated with at least the parameter or the timer based on the scaling factor;
a means for applying the adjustment with respect to at least the parameter or the timer for at least a portion of the fractional subsystem or another portion of the wireless communications system; and
a means for transmitting data over the carrier bandwidth for the fractional subsystem based at least in part on the adjustment.

28. The wireless communications system of claim 27, wherein the means for applying the adjustment further comprises:
a means for inverse scaling at least the identified parameter or the timer.

29. The wireless communications system of claim 27, further comprising:
a means for scaling at least the parameter or the timer associated with the fractional subsystem utilizing the scaling factor.

30. The wireless communications system of claim 27, further comprising:
a means for identifying at least an other parameter or an other timer of the fractional subsystem; and
a means for eschewing the adjustment with respect to at least the other parameter or the other timer.

31. The wireless communications system of claim 27, wherein the means for applying the adjustment further comprises:
a means for adjusting a QoS parameter using the scaling factor associated with the fractional subsystem to generate a scaled QoS parameter.

32. The wireless communications system of claim 31, further comprising:
a means for negotiating a QoS configuration with a base station based on the scaled QoS parameter.

33. The wireless communications system of claim 31, further comprising:
a means for transmitting a request based on the scaled QoS parameter.

34. The wireless communications system of claim 31, further comprising:
a means for transmitting a response based on the scaled QoS parameter.

35. The wireless communications system of claim 27, wherein the means for applying the adjustment further comprises:
a means for applying the adjustment at a Radio Access Technology (RAT) application layer of the fractional subsystem.

36. The wireless communications system of claim 27, wherein the means for applying the adjustment further comprises:
a means for applying the adjustment at a MAC layer.

37. A wireless communications device configured for scaling adjustments with respect to a fractional subsystem in a wireless communications system, the wireless communications device comprising:
a processor;
a transmitter;
memory in electronic communication with the processor;
instructions stored in the memory; wherein the instructions are executable by the processor to cause the wireless communications device to:
identify a scaling factor for the fractional subsystem, wherein the scaling factor is based on a ratio between a carrier bandwidth for a normal bandwidth system and a carrier bandwidth for the fractional subsystem, and wherein applying the scaling factor to the fractional subsystem results in at least a data rate of the fractional subsystem being changed from a data rate of the normal bandwidth system;
identify at least a parameter or a timer associated with the fractional subsystem;
determine an adjustment associated with at least the parameter or the timer based on the scaling factor;
apply the adjustment with respect to at least the parameter or the timer for at least a portion of the fractional subsystem or another portion of the wireless communications system; and
transmit data, using the transmitter, over the carrier bandwidth for the fractional subsystem based at least in part on the adjustment.

38. The wireless communications device of claim 37, wherein the at least one processor configured to apply the adjustment is further configured to:
adjust back a scaled QoS configuration to determine an unscaled QoS configuration; and
determine whether a mobile device is allowed the unscaled QoS configuration.

39. The wireless communications device of claim 38, wherein the at least one processor is further configured to:
utilize one or more QoS configuration profiles to determine whether the device is allowed the unscaled QoS configuration.

40. The wireless communications device of claim 37, wherein the at least one processor configured to apply the adjustment is further configured to:
adjust a slot cycle period using the scaling factor associated with the fractional subsystem to generate a scaled slot cycle period.

41. The wireless communications device of claim 37, wherein the at least one processor configured to apply the adjustment is further configured to:
adjust a slot cycle index using the scaling factor associated with the fractional subsystem to generate a scaled slot cycle index.

42. The wireless communications device of claim 37, wherein the at least one processor configured to apply the adjustment is further configured to:
adjust a data rate measurement unit associated with a Data Rate Control Index (DRX) using the scaling factor associated with the fractional subsystem to generate a scaled data rate measurement unit.

43. The wireless communications device of claim 37, wherein the at least one processor configured to apply the adjustment is further configured to:
adjust a number of slot packets based on the scaling factor associated with the fractional subsystem to cap a transmission delay.

44. The wireless communications device of claim 37, wherein the at least one processor configured to apply the adjustment is further configured to:
adjust a Data Source Channel (DSC) length using an inverse of the scaling factor associated with the fractional subsystem to generate an inverse scaled DSC length.

45. A computer program product for scaling adjustments with respect to a fractional subsystem in a wireless communications system comprising:
a non-transitory computer-readable medium comprising:
code for identifying a scaling factor for the fractional subsystem, wherein the scaling factor is based on a ratio between a carrier bandwidth for a normal bandwidth system and a carrier bandwidth for the fractional subsystem, and wherein applying the scaling factor to the fractional subsystem results in at least a data rate of the fractional subsystem being changed from a data rate of the normal bandwidth system;
code for identifying at least a parameter or a timer associated with the fractional subsystem;
code for determining an adjustment associated with at least the parameter or the timer based on the scaling factor;
code for applying the adjustment with respect to at least the parameter or the timer for at least a portion of the fractional subsystem or another portion of the wireless communications system; and
code for transmitting data over the carrier bandwidth for the fractional subsystem based at least in part on the adjustment.

46. The computer program product of claim 45, wherein the non-transitory computer-readable medium further comprising:
code for adjusting a QoS parameter using the scaling factor associated with the fractional subsystem to generate a scaled QoS parameter.

47. The computer program product of claim 46, wherein the non-transitory computer-readable medium further comprising:
code for negotiating a QoS configuration with a base station based on the scaled QoS parameter.

48. The computer program product of claim 46, wherein the non-transitory computer-readable medium further comprising:
code for adjusting back a scaled QoS configuration to determine an unscaled QoS configuration; and
code for determining whether a device is allowed the unscaled QoS configuration.

49. The computer program product of claim 48, wherein the non-transitory computer-readable medium further comprising:
code for utilizing one or more QoS configuration profiles to determine whether the device is allowed the unscaled QoS configuration.

50. The computer program product of claim 46, wherein the non-transitory computer-readable medium further comprising:
code for applying the adjustment at a Radio Access Technology (RAT) application layer of the fractional subsystem.

* * * * *